Figures 6, 8:
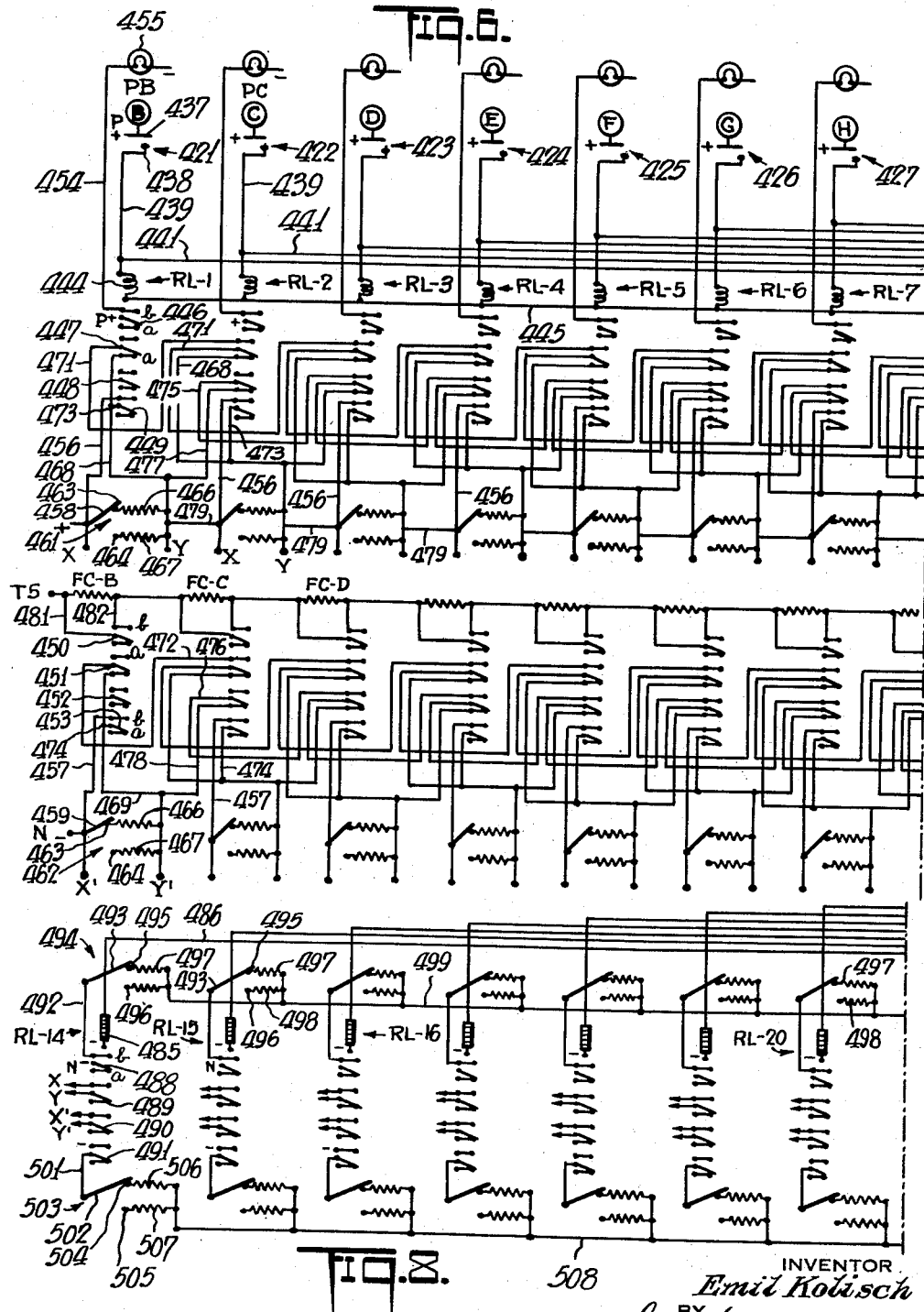

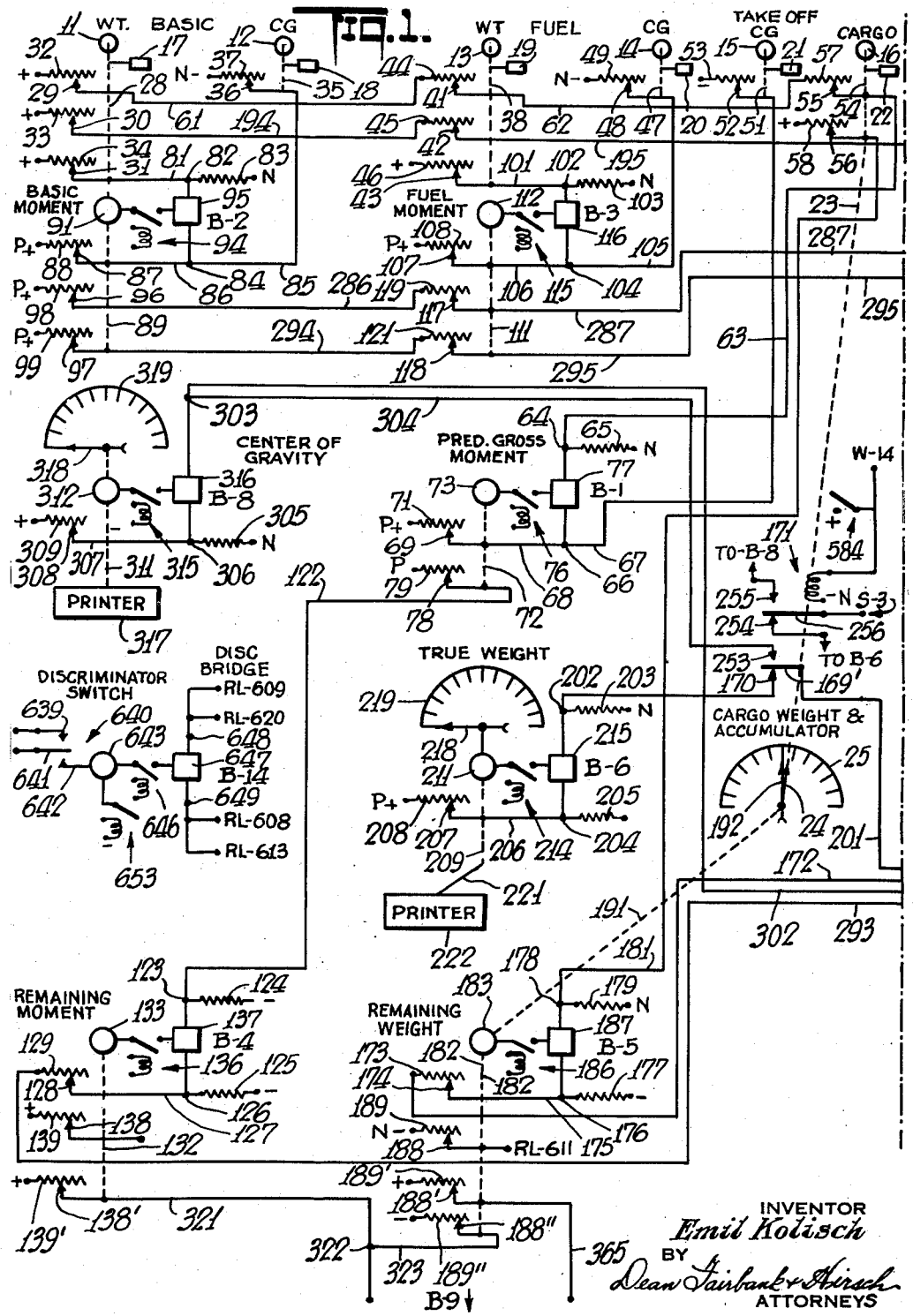

Aug. 25, 1959  E. KOLISCH  2,901,171
EQUIPMENT FOR PLANNING THE LOADING OF AIRCRAFT
Filed July 25, 1955  9 Sheets-Sheet 2
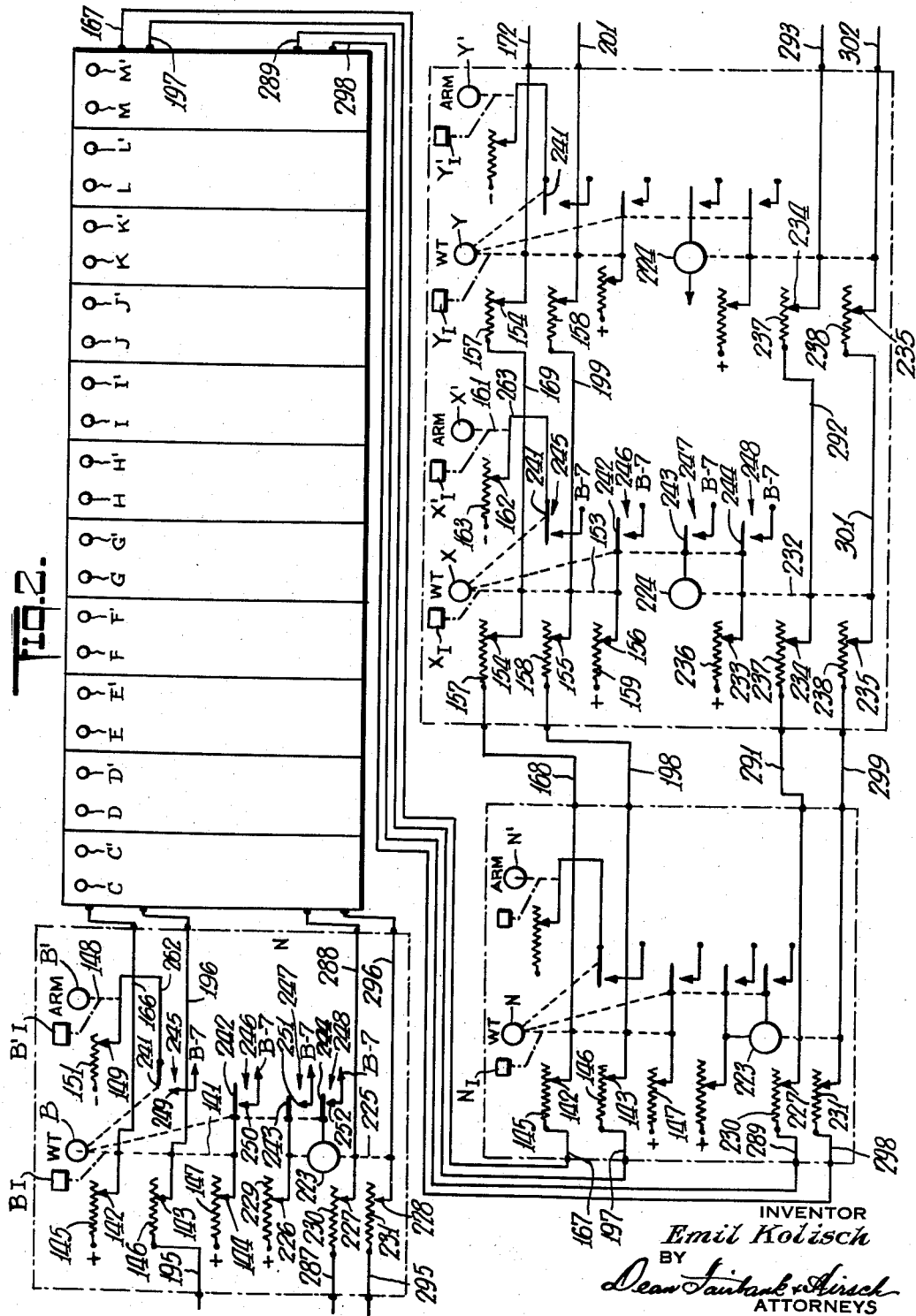
INVENTOR
Emil Kolisch
BY
Dean Fairbank & Hirsch
ATTORNEYS

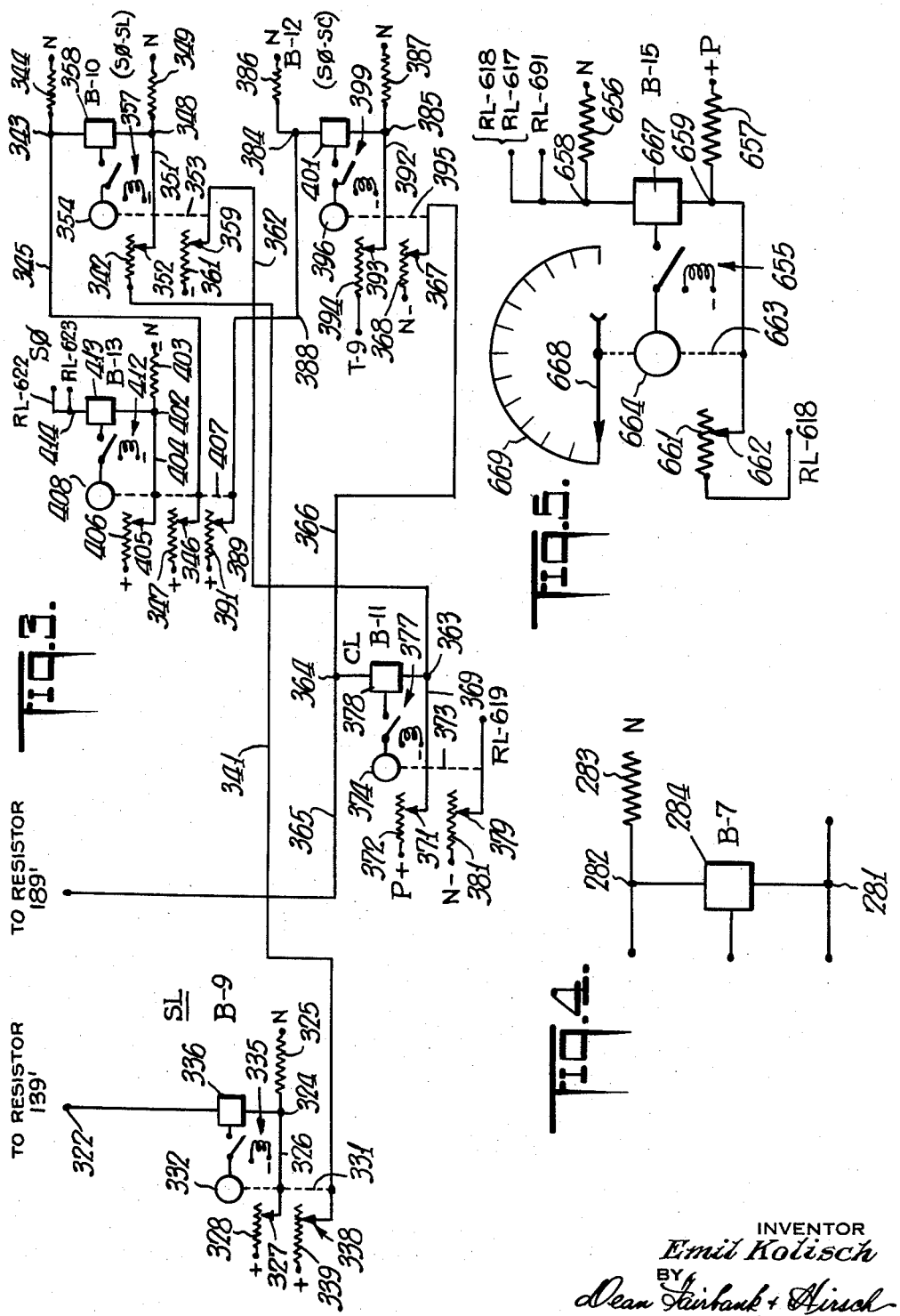

Aug. 25, 1959     E. KOLISCH     2,901,171
EQUIPMENT FOR PLANNING THE LOADING OF AIRCRAFT
Filed July 25, 1955     9 Sheets-Sheet 9
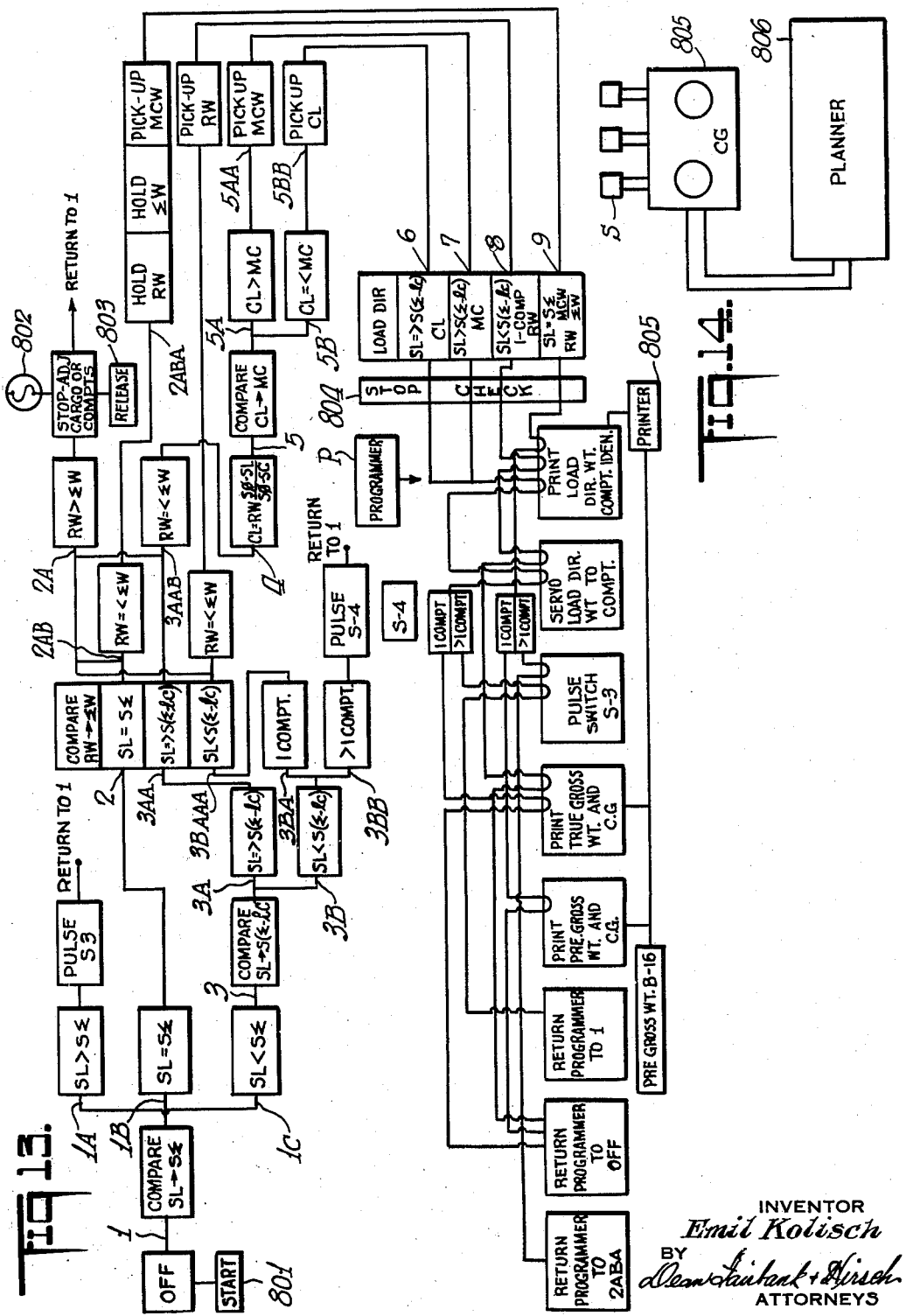
INVENTOR
*Emil Kolisch*
BY
ATTORNEYS United States Patent Office 2,901,171
Patented Aug. 25, 1959

2,901,171

EQUIPMENT FOR PLANNING THE LOADING OF AIRCRAFT

Emil Kolisch, New York, N.Y., assignor to Continental Electrolog Corp., a corporation of New York Application July 25, 1955, Serial No. 524,134

29 Claims. (Cl. 235—151)

In order for an aircraft to take off, fly and land safely, the distance of its center of gravity along the length of the aircraft from a fixed reference datum, must be at a position somewhere between certain definite fixed limits which are generally determined by the manufacturer of the aircraft.

The unloaded weight of an aircraft, i.e., without crew, fuel, extra equipment or cargo, but including all standard equipment, is determined generally by actually weighing the aircraft on a suitable weighing kit. The center of gravity position of the unloaded aircraft is determined generally by utilizing suitable formulas in which the unloaded weight is a factor.

Assuming that the aircraft is to travel to a predetermined destination requiring a given fuel load, the weight of which is readily ascertainable, a specialist in the weights and balances division of the airport, taking into consideration the weight and center of gravity position of the unloaded aircraft, as well as the weight of the crew, fuel and extra equipment and the location of such items, may determine by means of standard calculating devices well known in the art, the basic operating weight and basic operating center of gravity position of the aircraft, i.e., the weight and center of gravity position of the aircraft loaded with all but cargo.

The payload or weight of cargo that can be carried by the aircraft is of course the permissible gross take-off weight less the basic operating weight.

According to one present loading practice, the cargo loading supervisor attempts to distribute the available cargo load through the compartments or regions of the aircraft, so that the final center of gravity position of the aircraft fully loaded with the available cargo, will fall within the permissible limits of the center of gravity, preferably at a desired optimum position which may be midway between such limits.

As the loading proceeds, according to present loading practice, the weights of the successive items of cargo, generally indicated on each item by the shipper or manufacturer, and their position in the aircraft are noted on the manifest. After the aircraft has been loaded, the manifest is turned over to the weights and balances division of the airport which determines the final or take-off center of gravity position of the aircraft as thus loaded. Should the final center of gravity position thus determined be outside of the permissible limits of the center of gravity, the cargo loading supervisor will be advised that the cargo is improperly loaded and must be shifted.

As the distribution of the cargo load requires estimation, computations and reference to charts, some shifting of cargo may be required, however skilled the cargo loading supervisor, in order to correct inevitable errors in loading. This is a very time-consuming and arduous procedure by reason of the difficulty of manipulating heavy and bulky items of cargo within the limited confines of the aircraft. In addition, each time the cargo is shifted, new calculations must be made to check for correctness of the new distribution.

As a result of the foregoing, the take-off of the aircraft will be delayed with consequent loss of efficiency due to reduction of flying time with consequent piling up of cargo in the warehouse.

Where the final or take-off center of gravity position of the aircraft is determined by means of a specially designed slide rule, or computed by the use of a standard calculating machine, to which the data from the manifest is transferred, the many manipulations required in the use of such units are time-consuming. Moreover, they are subject to human error as there is no indication or registration that remains throughout the determination of center of gravity of the various items of data entered into the computations and therefore no assurance that correct entries of data have been made. The calculations must accordingly be carefully checked and re-checked for errors and even with such checking and re-checking, there is no assurance that some error has not remained undetected.

Where, in the attempt to eliminate the need for shifting of cargo, planning of the cargo distribution is done before loading and such planning involves the use of a slide rule or calculating machine, the problems above noted render such planning operation time-consuming and subject to error and such difficulties are aggravated when problems of air-drops, off-loading and on-loading must be considered.

Where, after the aircraft is loaded and the center of gravity position is determined to be within safe limits by resort to the slide rule or calculating machine as above pointed out, additional cargo must be loaded into the aircraft, the new center of gravity position must then be determined in the same manner as previously described with resultant delay in the take-off of the aircraft and without assurance that error does not remain.

It is among the objects of the invention to provide an automatic computing equipment which is universally applicable by resort to simple manipulation, for use with any of various models, sizes and specification of aircraft, which may readily and expeditiously be operated to solve numerous problems including the determination of the distribution of a given cargo load for a desired or take-off final center of gravity position,[1] the checking of such planned loading of an aircraft to confirm that its center of gravity position falls within desired limits, the re-checking of the loaded aircraft in the event further cargo is to be added, and the determination of the effects on the center of gravity position of air-drops, off-loading, on-loading and the like, all without the need for calculations of any sort, or the consultation of charts, and which provides a fixed indication of the data set into the equipment for convenience in confirming the correctness of entries.

According to the invention from a broader aspect, the equipment has facilities whereby there may be manually set into the computations a desired sequence of compartments (not necessarily adjoining) through which the cargo weight is to be distributed, whereupon the equipment automatically determines a distribution of the cargo weight through the compartments of the sequence in such manner that the moment of the cargo to be loaded according to such distribution when added to the basic operating moment of the aircraft (moment of the aircraft loaded with all but cargo) will equal the desired gross moment of the aircraft, which is the product of the desired take-off center of gravity position and the gross take-off weight of the aircraft, to attain substantially the desired final center of gravity position.

According to one feature of the invention, distribution

---

[1] Illustratively, the nose of the aircraft is taken as the reference datum for the position of center of gravity and for lengths of moment arms, i.e., distance to centroids of compartments, in all illustrations that follow.

of the cargo weight in all of a selected sequence of compartments is to be effected proportionally according to a selected load distribution pattern substantially to attain the desired center of gravity position when the ratio ($S\Sigma$) of the sum of the moments of a selected weight distribution pattern for the compartments of the selected sequence, to the sum of the selected weights for such compartments, is substantially equal to the ratio (SL) of the remaining moment to remaining weight; the term "remaining" defining the moment and weight respectively, remaining to be added at each step of the load planning.

According to another feature, the equipment has facilities for changing the load distribution pattern so that, for example, based upon the nature of the cargo to be loaded or the weight of the cargo, the portion of the cargo weight to be distributed in any compartment may be a predetermined proportion of the entire cargo weight.

According to another feature, the equipment has facilities for determining and indicating such proportional distribution when ($S\Sigma$) deviates from (SL) by not more than a pre-set amount.

According to another feature, the equipment has facilities for modifying the proportional load distribution determined by the selected distribution pattern, when $S\Sigma$ is not equal to SL ($S\Sigma \neq SL$), so that after such modified proportional load is set into the equipment for the initial compartment or compartments of the sequence to be loaded, thereafter the ratio of the then remaining moment to the then remaining weight will substantially equal the ratio of the sum of the moments of the selected weight distribution pattern for the compartments of the selected sequence less the initial compartment or compartments, to the sum of the selected weight distribution pattern for such compartments, thereby to effect proportional distribution of the then remaining cargo weight to substantially achieve the desired final center of gravity position of the aircraft.

(a) When $SL > S\Sigma$, the weight to be loaded into the initial compartment or compartments for which the load planning is being computed must be less than the proportional distribution in order to attain the desired center of gravity position.

(i) According to one embodiment if $SL > S\Sigma$, the first compartment in the selected sequence is eliminated and the equipment will automatically recompute $S\Sigma$ based on the remaining compartments in the sequence and this procedure is thus repeated until $SL = \text{or} > S\Sigma$ for the remaining compartments in the selected sequence.

(ii) According to another embodiment, if $SL > S\Sigma$, but is not greater than the ratio ($S\phi$) of the sum of the moments of the compartments in the selected sequence less the compartment for which the load is being planned, to the sum of the selected weights of such compartments, the equipment modifies the proportional load distribution for the compartment for which the load is being planned so that after such modified proportional load is set into the equipment for the initial compartment or compartments of the sequence to be loaded, thereafter the ratio of the then remaining moment to the then remaining weight will substantially equal the ratio of the sum of the moments of the selected weight distribution pattern for the compartments of the selected sequence less the initial compartment or compartments, to the sum of the selected weight distribution pattern for such compartments, thereby to effect proportional distribution of the then remaining cargo weight to substantially achieve the desired final center of gravity position of the aircraft.

(b) When $SL < S\Sigma$, the weight to be loaded into the initial compartment or compartments for which the load planning is being computed, must be greater than the proportional distribution in order to attain the desired center of gravity position.

(i) According to one embodiment the equipment compares SL to the ratio $S(\Sigma - 1c)$ of the sum of the moments of the selected pattern of the compartments in the sequence less the last compartment, to the sum of the selected weights of such compartments. If $SL = \text{or} > S(\Sigma - 1c)$, the equipment will modify the proportional load distribution for the first compartment as set forth in (a)(ii) above. However, if $SL < S(\Sigma - 1c)$, the equipment eliminates the last compartment of the sequence from the computations and automatically recomputes $S\Sigma$.

The equipment also has facilities for determining whether the planned load for a compartment exceeds the weight capacity of such compartment and if so for indicating such weight capacity. In addition, the equipment has facilities for indicating throughout the load planning, the accumulated weight of the aircraft as thus planned for loading and the corresponding center of gravity position.

More specifically, facilities are provided for manually setting into the computation of the equipment:

(a) the basic weight of the aircraft (which for purposes of illustration will be assumed to include the weight of the unloaded aircraft with its standard equipment plus weight of crew and extra equipment, but without fuel and cargo);

(b) the basic center of gravity position of the aircraft;

(c) the fuel weight;

(d) the fuel center of gravity position;

(e) the position of the desired final center of gravity;

(f) the cargo weight to be carried;

(g) the planned weight and preload weight to be loaded into the respective compartments and preload stations of the aircraft; and (h) a fixed position in each of the compartments and preload stations (illustratively the centroid of the respective compartments and preload stations).

The equipment has means to determine automatically:

(a) the gross moment of the aircraft as the product of the desired final center of gravity position and the gross weight (the sum of the basic weight, fuel weight and cargo weight);

(b) the moment of the planned load for each compartment and preload for each station as the product of the planned load or preload and the centroid position of the associated compartment or station;

(c) the basic moment of the aircraft as the product of the basic weight and basic center of gravity position;

(d) the fuel moment as the product of the fuel weight and fuel center of gravity position;

(e) the remaining moment, i.e., the difference between the gross moment and the sum of the basic moment, the fuel moment and the accumulated preload and cargo moments thus far planned; and (f) the remaining weight, i.e., the difference between the cargo weight and the sum of the preload weights and those thus far planned for the respective compartments.

More particularly, the basic weight of the aircraft (weight of the aircraft loaded with all but cargo and fuel) and the corresponding basic center of gravity position are set into the equipment as is the fuel weight and fuel center of gravity. In addition, the cargo weight to be carried and the desired final center of gravity position are also set into the equipment.

The equipment will thereupon automatically compute the desired gross moment of the aircraft, i.e., the product of the desired final center of gravity position and desired gross weight of the aircraft (the sum of the basic weight, the fuel weight and the cargo weight).

Thereupon, the equipment will automatically determine the remaining weight to be loaded into the aircraft, which is equal to the cargo weight less any preload and the amount (if any) of cargo weight thus far planned for loading. At the start of the load planning such remaining weight is thus equal to the cargo weight less the weight of any pre-load set into the equipment and decreases as planned loads are set into the equipment.

In addition, the equipment will determine the remaining moment corresponding to such remaining weight, which is equal to the gross moment less the sum of the basic moment, the fuel moment and moments of any pre-load and of the weight thus far planned for loading, all of which moments are computed by the equipment. At the start of the load planning, such remaining moment is thus equal to the cargo moment less any pre-load moment and decreases as planned loads are set into the equipment.

It is apparent that if the cargo weight is distributed through the compartments of the aircraft so that the sum of the moments of such cargo weight when added to the sum of the basic moment, the fuel moment and preload moment, equals the gross moment, the desired final conditions of gross weight and gross moment will be achieved and hence the aircraft will have the desired final center of gravity position.

Assuming that the aircraft has "$n$" compartments to be loaded and there are no preloads, then the entire cargo weight must be so distributed through said "$n$" compartments, that the resultant sum of the cargo moments, based illustratively upon the centroids of the respective compartments, plus the sum of the basic moment and fuel moment, equals the gross moment.

In order to determine the distribution of the cargo weight through the "$n$" compartments, the center of gravity position of a selected given weight distribution through the "$n$" compartments of the aircraft, which is equal to the ratio, hereinafter designated $S\Sigma$, of the sum of the moments of the given weight distribution through the "$n$" compartments to the sum of the given weights through such compartments, is compared with the cargo weight center of gravity position, which is equal to the ratio, hereinafter designated SL, of the cargo moment to cargo weight. If $S\Sigma = SL$, then if the cargo weight is distributed through the "$n$" compartments of the aircraft in the same proportion as the selected given weights for each compartment, the cargo weight as thus distributed will have the desired cargo center of gravity position. Thus, the desired final center of gravity position of the loaded aircraft will be attained.

To illustrate the foregoing, assume that the basic operating weight of the aircraft (weight of aircraft loaded with all but cargo) is 9,000 pounds, the cargo weight is 1,000 pounds and the desired final center of gravity position is 100 inches. The gross moment will thus be 1,000,000 inch-pounds. Assuming that the basic operating moment is 750,000 inch-pounds, the remaining cargo moment at the beginning of load planning is 250,000 inch-pounds. As the remaining cargo weight is 1,000 pounds, the ratio SL of the cargo load is 250 inches.

If the aircraft has four compartments A, B, C and D with a selected given weight distribution (say the maximum weight capacity) of 1,000, 4,000, 4,000 and 1,000 pounds respectively, and the centroids of the compartments are 100, 200, 300 and 400 inches respectively, the ratio $S\Sigma$ of such selected given weight distribution is also found to be 250 inches.

Thus, if the remaining weight of 1,000 pounds is distributed through compartments A, B, C and D in the same proportion as the selected given weight of 10,000 pounds, the moment of the weight of 1,000 pounds will be such as to attain the desired ratio of 250 inches which will provide the desired center of gravity position of the aircraft.

Accordingly, the cargo load actually to be accommodated is to be apportioned to the respective compartments "$n$" in the same proportion as the selected given weight distribution. For example, since 1,000 pounds is the given weight for compartment A, such weight is $$\frac{1,000}{10,000} \text{ or } \frac{1}{10}$$

of the entire given weight and the remaining weight of 1,000 pounds multiplied by $\frac{1}{10}$ or 100 pounds is the weight to be loaded into compartment A. Similarly, the weights to be loaded into compartments B, C and D are 400, 400 and 100 respectively. By multiplying such weights by the centroids of the respective compartments, we find a total moment of 250,000 inch-pounds so that the ratio of the moment of 250,000 inch-pounds to the corresponding weight of 1,000 pounds as thus loaded is 250 inches as desired to give the desired final center of gravity position of 100 inches of the loaded aircraft.

If $S\Sigma$ of the selected given weight distribution is not equal to SL of the remaining cargo weight ($S\Sigma \neq SL$), it is apparent that the desired center of gravity position of the aircraft will not be attained if the remaining cargo weight be distributed proportionally. Thus, assuming that the total remaining or cargo weight is 1,000 pounds and the basic operating moment is 740,000 inch-pounds for a remaining moment of 260,000 inch-pounds, then SL=260 inches. It is apparent that if such cargo weight should be distributed proportionally through the compartments A, B, C and D, as the sum of the basic operating moment of 740,000 inch-pounds and cargo moment of 250,000 inch-pounds divided by the gross weight of 10,000 pounds equals 99 inches, the final center of gravity of the aircraft as thus loaded would be forward of the desired final center of gravity position of 100 inches.

Thus, with a fixed remaining weight to be distributed, to attain the desired center of gravity, where SL (260) is greater than $S\Sigma$ (250), a greater moment would be required aft and hence the weight to be loaded into the first compartment in the sequence would have to be less than the proportional distribution of such remaining weight for such compartment. As it is ordinarily uneconomical in labor and time to secure relatively insignificant loads in any one compartment, it is preferable to distribute the load among less than all of the selected compartments of the aircraft, and in one illustrative embodiment of the invention no loading is effected for compartment A when SL is materially greater than $S\Sigma$.

The equipment will therefore indicate that the first compartment of the sequence is to be left empty and such compartment is eliminated from further computations. As a result, the selected given weight distribution of 9,000 pounds for compartments B, C and D would have a moment of 2,400,000 inch-pounds and the new ratio $S\Sigma$ of the given distribution would be 266.66 inches. The equipment will then determine that the ratio SL, which is still 260, is forward of the given weight distribution of compartments B, C and D.

If the remaining or cargo weight of 1,000 pounds should be distributed proportionally through compartments B, C and D, based on the proportions 4/9, 4/9 and 1/9, as the sum of the basic operating moment of 740,000 inch-pounds and cargo moment of 266,640 inch-pounds divided by the gross weight of 10,000 pounds equals 100.664 inches, the final center of gravity position of the aircraft as thus loaded would be aft of the desired final center of gravity position. Therefore, when $S\Sigma$ is greater than SL ($S\Sigma > SL$) a greater moment would be required forward and the weight to be loaded into compartment B to achieve the desired final center of gravity position would have to be in excess of the proportional distribution of such remaining weight for such compartment B, if the compartments other than B are to be loaded proportionally as above.

However, in order that such excess not be so great as to leave very little weight for compartment D, for example, which would not provide the desired economy of labor and time in loading, the equipment will, in the illustrative embodiment shown, determine the relation of the remaining moment and remaining weight, SL, to the sum of the given moments and given weights for compartments B and C, $S(\Sigma - 1c)$ in order to determine if the last compartment D is to carry any load. If SL is less than $S(\Sigma - 1c)$ it will mean that too little weight would be provided for the last compartment D and the equipment would indicate that the said compartment D is to be left empty and such compartment eliminated from further computations. However, as $S(\Sigma-1c)$ is equal to $$\frac{2,000,000}{8,000} \text{ or } 250$$

$SL$ (260) is between $S\Sigma$ (266.66) and $S(\Sigma-1c)$ (250). Hence, compartment D is to carry cargo. In the illustrative embodiment shown, the equipment will now determine the weight to be loaded into compartment B. As $SL$ is less than the $S\Sigma$ for compartments B, C and D, as above pointed out, the weight to be loaded into compartment B is not proportional to the given weight distribution, but is greater. However, it is not so great as to have too small a load in compartment D.

If the weight to be loaded into said compartment B is such that after it is loaded, SL of the remaining cargo weight thereafter $$\left(\frac{\text{remaining moment}}{\text{remaining weight}}\right)$$

is equal to $S\Sigma$ of the selected given weight distribution for the subsequent compartments C and D, then as above pointed out such remaining cargo weight can be distributed proportionally through such compartments C and D to attain the desired final center of gravity.

This can be expressed as follows:

(1) $$\frac{RM-MB}{RW-WB}=\frac{\Sigma M_{CD}}{\Sigma W_{CD}}$$

where $RM$ = remaining moment before loading compt. B, C, D
$RW$ = remaining weight before loading compt. B, C, D
$MB$ = moment of weight to be loaded into compt. B
$WB$ = $CL$ (computed load) = weight to be loaded into compartment B
$\Sigma M_{CD}$ = sum of given moments of compartments C, D
$\Sigma W_{CD}$ = sum of given weights of compartments C, D and (a) $$\frac{\Sigma M_{CD}}{\Sigma W_{CD}}=S\phi_{CD}$$

(b) $MB = CL \times SC_B$ (centroid of B)
(c) $RM = RW \times SL$ (ratio of moment to weight of remaining load)

Solving Formula 1 we find:

(2) $$\frac{RM-MB}{RW-CL}=S\phi_{CD}$$

(3) $RM - MB = S\phi RW - S\phi CL$

Substituting for $RM$ and $MB$ we find:

(4) $RW \cdot SL - CL \cdot SC_B = S\phi \cdot RW - S\phi \cdot CL$
(5) $CL(S\phi - SC_B) = RW(S\phi - SL)$ (6) $$CL = RW\left(\frac{S\phi - SL}{S\phi - SC_B}\right)$$

Applying Formula 6 to compute the load for compartment B where:

$RW = 1,000$ $$S\phi = \frac{1,600,000}{5,000} = 320$$

$SL = 260$ $SC_B = 200$ $$CL = 1,000\left(\frac{320-260}{320-200}\right) = 500$$

Thus, if 500 pounds is to be loaded into compartment B, the moment of such load is equal to $500 \times 200$ or 100,000 inch-pounds. Thereupon, the remaining moment is 260,000—100,000 or 160,000 inch-pounds and the remaining weight is 50 so that $$SL = \frac{160,000}{500} = 320$$

As the $S\Sigma$ for compartments C and D also equals 320, the remaining weight of 500 can be distributed proportionally into compartments C and D. Consequently, as compartment C has a given weight of 4,000 pounds and C and D combined have a total value of 5,000 pounds, ⅘ of the weight of 500 pounds or 400 pounds is to be loaded into compartment C. Thereupon the remaining moment will be 160,000—120,000 or 40,000 inch-pounds and the remaining weight 100 pounds so that $SL = 400$. As the $S\Sigma$ for compartment D also equals 400, the proportional distribution for such weight of 100 is also 100 pounds.

As the moment of such weight is 40,000, it is apparent that after compartment D is loaded, the remaining moment and remaining weight will both be zero and the desired center of gravity position of the aircraft is attained.

In the accompanying drawings in which are shown one or more of various possible embodiments of the several features of the invention, Fig. 1 is a circuit diagram of substantially all of the computing portion of the equipment, Fig. 2 is a circuit diagram of the compartment loading positions and the preload positions, Fig. 3 is a circuit diagram of the portion of the equipment for computing the loads for the respective compartments.

Figure 9:
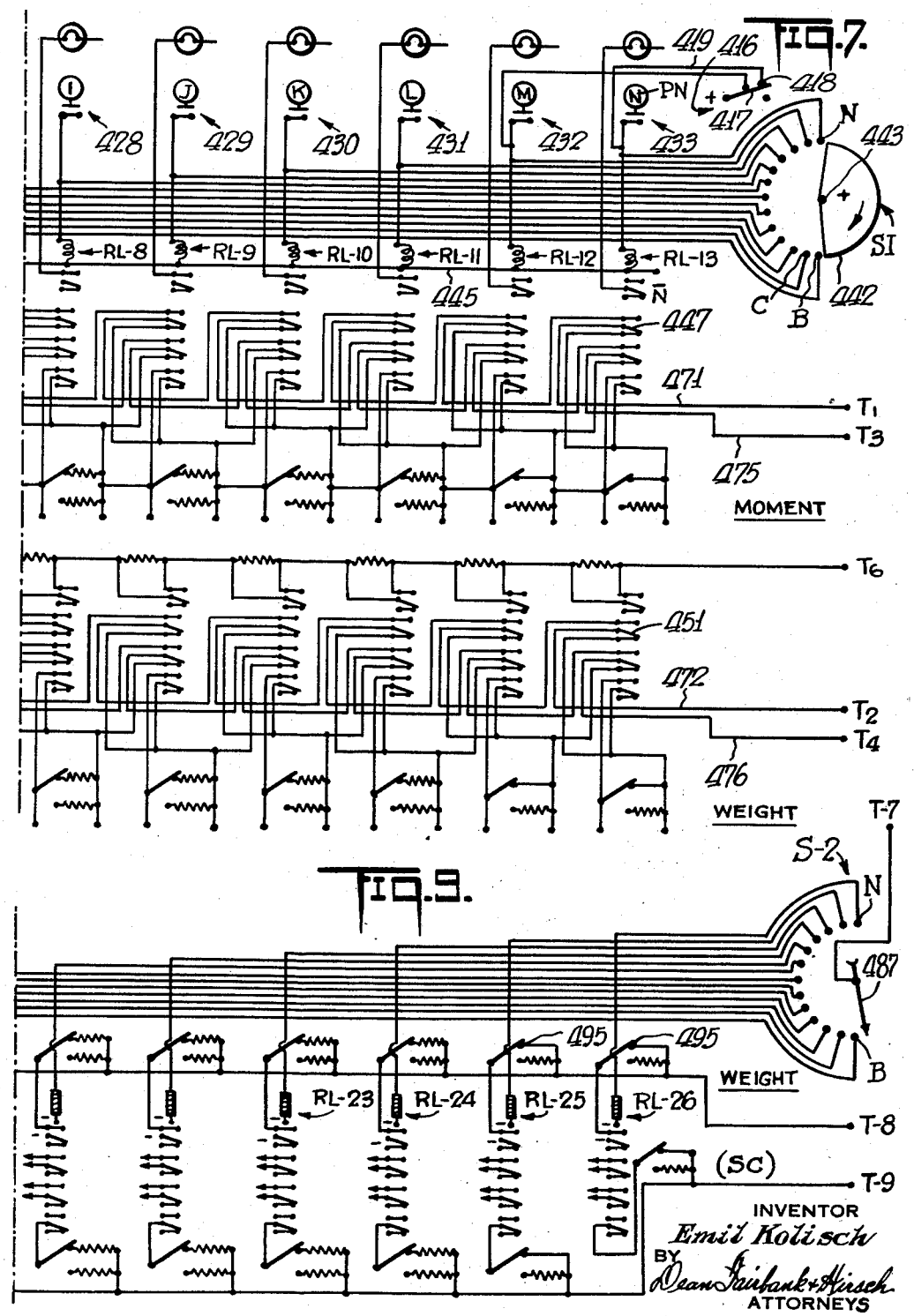
Figure 10:
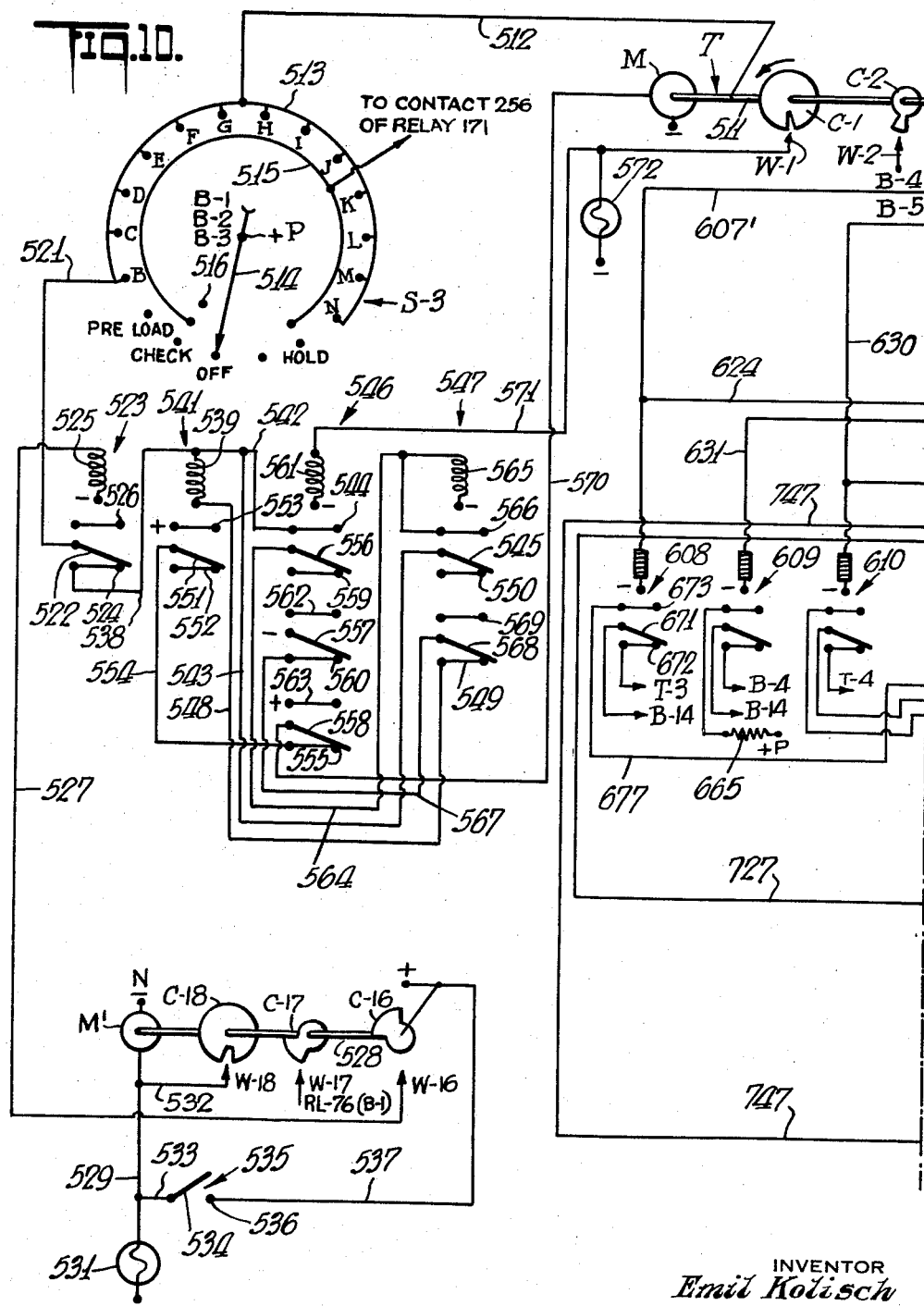
Figure 11:
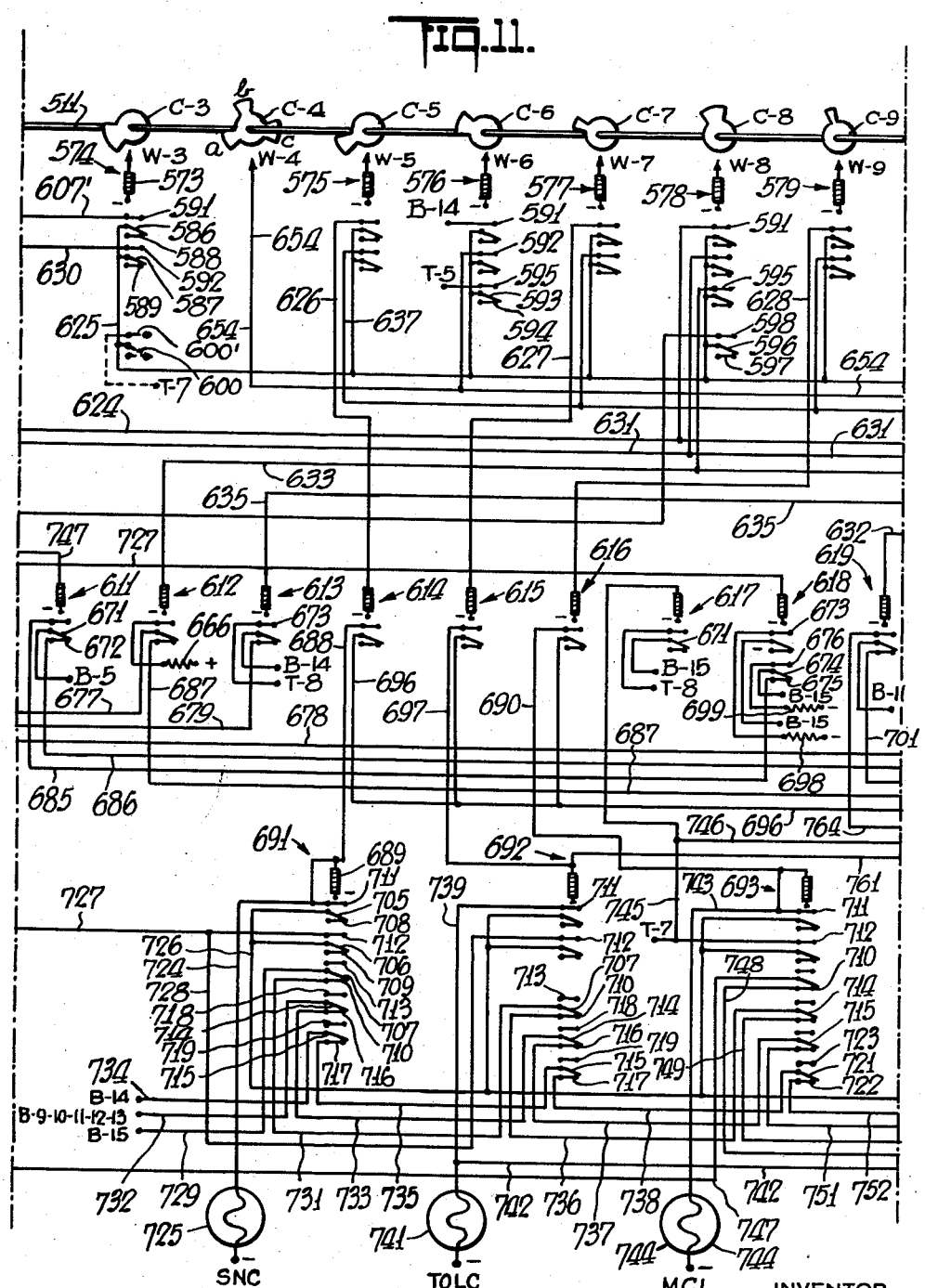
Figure 12:
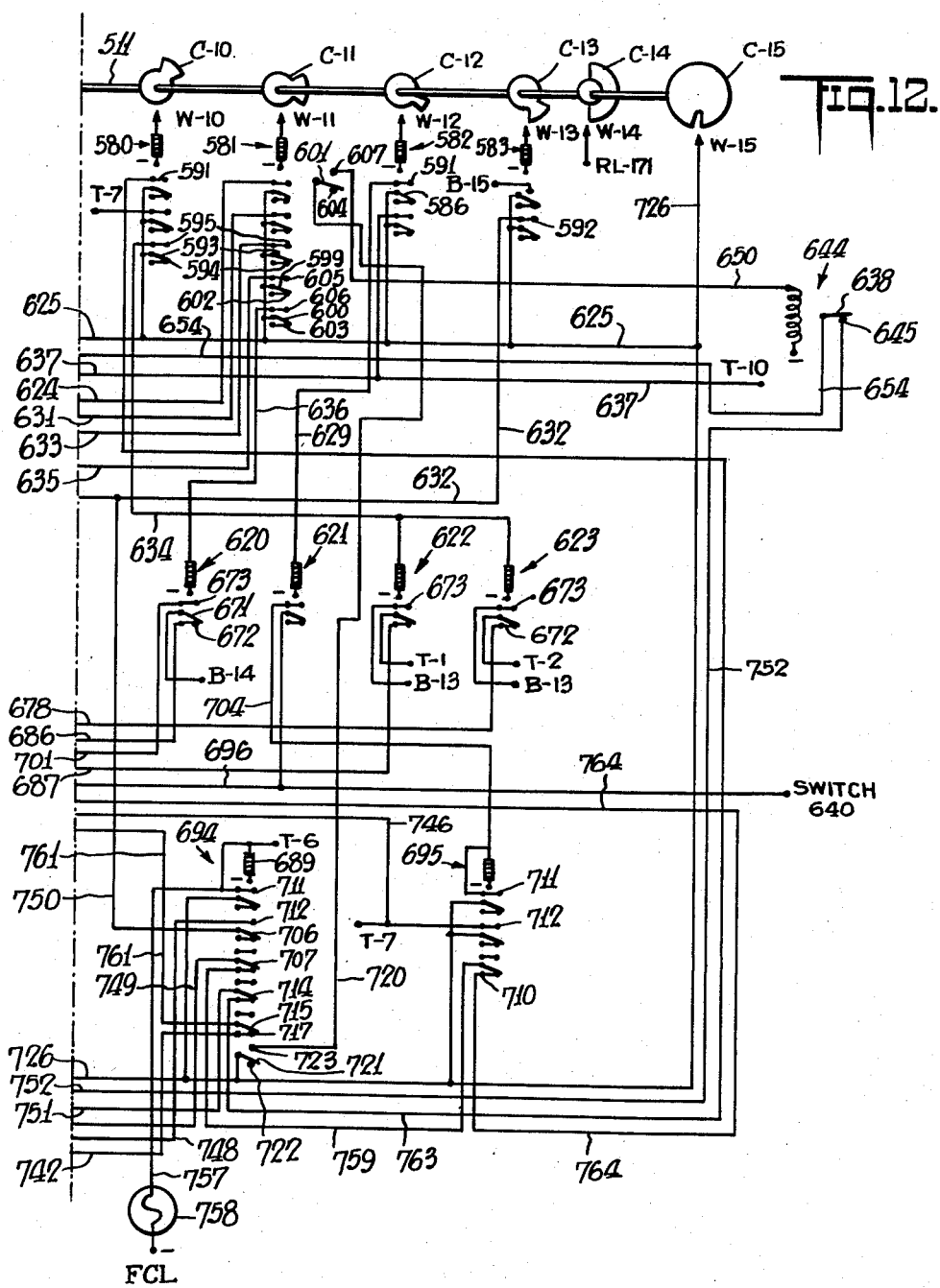

Fig. 4 is a circuit diagram of the bridge for determining the moments of the compartment loads and preloads, Fig. 5 is a circuit diagram of the cargo loading director, Figs. 6 to 9 are circuit diagrams of the given load distribution portion of the equipment, Figs. 10, 11 and 12 are circuit diagrams of the cycling controls for the equipment, Fig. 13 is a block diagram showing another embodiment of the equipment, and Fig. 14 is a view similar to Fig. 13 showing an application of the embodiment of Fig. 13.

The following brief description is designed to facilitate understanding of the invention without the need for tracing relatively complicated circuits.

GENERAL DESCRIPTION

In the embodiments of the equipment hereinafter described, adjustable resistors controlled by knobs on the equipment are manually set respectively to the basic weight, basic center of gravity position, fuel weight, fuel center of gravity position, desired final center of gravity position and cargo weight to be carried.

The basic weight and basic center of gravity resistors are in a bridge circuit B–2, which, when in balance, will set a variable resistor to a position related to the basic moment of the aircraft. Similarly, the fuel weight and fuel center of gravity resistors are in a bridge circuit B–3, which, when in balance, will set a variable resistor to a position related to the fuel moment.

The remaining weight of cargo to be planned for loading is determined by a bridge circuit B–5, in which one arm is a resistor of value related to the cargo weight and another arm are resistors of value related to the respective cargo load portions thus far planned, which at the start of the load planning is zero. Hence, when the remaining weight bridge is in balance, a variable balancing resistor in series with the resistors related to the planned load will be set to the remaining weight, which is at that time the cargo weight.

Similarly, the remaining moment of the cargo to be planned for loading is determined by another bridge circuit (B–4) in which one arm is a resistor of value related to the predetermined gross moment and in another arm are series connected resistors respectively of value related to the basic moment, the fuel moment and the moments of the respective cargo load portions, i. e., the cargo moment thus far planned, which latter at the start of the load planning is zero.

The gross moment is determined by a bridge B–1, in which one arm is the final center of gravity position and another arm are the basic weight, fuel weight and cargo weight resistors in series, i. e., the gross weight. Thus, when the gross moment bridge is in balance, a variable balancing resistor in said bridge will be set to the product of the final center of gravity position and the gross weight, i.e., the gross moment. The gross moment bridge also sets another resistor to a value related to such gross moment and it is this resistor that is connected in the remaining moment bridge B–4, above referred to.

Hence, a variable resistor in series with the series connected basic moment, fuel moment and planned cargo resistors will be set to the difference between the gross moment and the sum of the basic, the fuel and planned cargo moments, and as the planned cargo moment is zero at that time, such difference, i.e., the remaining moment, is equal to the moment of the total cargo.

The equipment, to determine the distribution of the remaining cargo weight first compares the ratio (SL) of remaining moment to remaining weight to the ratio, (SΣ) the sum of the moments of the compartments in the sequence to be loaded (which is initially determined by the operator) to the sum of the weight capacities of such compartments. This is accomplished by a discriminator bridge circuit (B–14), which will close a switch only when SL>SΣ. Upon closure of such switch a relay will be actuated to energize a lamp, indicating that the operator should switch to the next compartment (the first compartment in the sequence is not to be loaded). If SL is not greater than SΣ (SL≯SΣ), the equipment then compares SL with S(Σ−1c), i.e., the ratio of the sum of the moments of all the compartments in the sequence less the last compartment, to the sum of the weights of such compartments. Such comparison is also made by the discriminator bridge circuit (B–14).

If SL<S(Σ−1c) a relay will be actuated to energize a lamp indicating that the operator should remove the last compartment in the sequence from the computation. If SL= or >S(Σ−1c) the equipment then determines what portion of the remaining cargo weight should be planned for the first compartment remaining in the sequence.

This is determined by the solution of the formula $$CL = RW\frac{S\phi - SL}{S\phi - SC}$$

To this end, there is a bridge circuit B–9, which determines SL, said bridge having in two arms resistors of value related respectively to the remaining moment and the remaining weight in order to determine when in balance, the quotient SL.

Another bridge circuit (B–13) which determines Sϕ, has in one arm resistance of value related to the moments (ΣM less first compartment) of the weight capacities of the compartments in the sequence, less the compartment for which the load is being planned and in another arm resistance of value related to the corresponding weights (ΣW less first compartment). Bridge B–13, when in balance, determines Sϕ as the quotient, $$\frac{\Sigma M \text{ less first compartment}}{\Sigma W \text{ less first compartment}}$$

Another bridge, B–10, determines Sϕ−SL and sets a resistor to a value related to such difference.

Another bridge circuit B–12, determines Sϕ−SC and sets a resistor to a value related to such difference.

An additional bridge B–11, which determines CL, (the computed load) has in one arm resistance of value related to the remaining weight (RW), in another arm resistance of value related to Sϕ−SL and in a third arm resistance of value related to Sϕ−SC and this bridge will, when in balance, set a resistor to a value related to $$RW\frac{S\phi - SL}{S\phi - SC}$$

which is the planned weight for the first compartment of the sequence.

After such weight is determined, it is set into the computation by appropriate setting of a resistor associated with such first compartment to be loaded. The equipment will, through an associated bridge B–7, determine the moment of such weight and this moment and weight are subtracted by the remaining moment and remaining weight bridges B–4 and B–5 from the gross moment and cargo weight respectively, to give a new remaining moment and remaining weight.

The equipment will then repeat the operations above described and when SL is compared with SΣ for the compartments in the sequence less the first compartment which has already been planned, if SL=SΣ, the discriminator will have no effect on the associated switch. As a result, when the new values are substituted in the formula $$CL = RW\frac{S\phi - SL}{S\phi - SC}$$

CL will be equal for the second compartment in the sequence to the remaining weight × $\frac{\text{the capacity of the second compt.}}{\text{the sum of the capacities of the compartments in the sequence less the first compartment}}$ and such weight planned for the second compartment is set into the equipment.

As thereafter SL=SΣ for each successive compartment in the sequence, when the entire remaining weight has been planned, the entire remaining moment will equal zero, so that the desired condition of loading will have been attained for the desired final center of gravity position.

Such final center of gravity position is computed by a bridge circuit B–8, in which one arm will be resistance of value related to the gross weight, i.e., the sum of the basic weight, fuel weight and planned weights (which latter equals the cargo weight) and in another arm resistance of value related to the gross moment, i.e., the sum of the basic moment, fuel moment and the sum of the moments of the several planned weight portions (which latter equals the cargo moment). Thus, when the center of gravity bridge is in balance, it will set a balancing resistor to the quotient of the sum of the moments divided by the sum of the weights which will equal the desired center of gravity position.

For compliance with the statutory requirements, one or more embodiments are shown in the drawings and described in detail hereinafter.

To facilitate understanding, each element of the equipment will now be separately described under appropriate headings, followed by a detailed description of the operation.

*Basic condition information controls (Fig. 1)*

Referring now to the drawings, as shown in Fig. 1, the equipment has a plurality of manually operated control knobs 11, 12, 13, 14, 15 and 16 which may be adjusted respectively to the basic weight of the aircraft (weight of aircraft including crew, and safety equipment, but without fuel and cargo), the basic center of gravity of the aircraft (distance of the center of gravity of the basic weight from a predetermined reference datum), the weight of fuel to be loaded, the distance of the center of gravity of such fuel weight from the reference datum, the desired take-off or final center of gravity of the loaded aircraft and the cargo weight to be loaded.

Associated with each of knobs 11, 12, 13, 14, 15 and 16 is a suitable indicating device 17, 18, 19, 20, 21 and 22 which may be counters of the type put out by the Veeder Root Company and which are mechanically connected to the associated knob in conventional manner.

In addition, the knob 16, through a shaft 23 also drives the pointer 24 associated with cargo weight and cargo accumulator dial 25 for further indication of the cargo weight to be loaded.

Basic weight (Fig. 1)

The basic weight knob 11 drives a shaft 28 to which are ganged the contact arms 29, 30 and 31 of variable electrical units, illustratively resistors 32, 33 and 34, one end of each of which is connected to positive main P, said resistors being adapted to be set to a value proportional to the basic weight.

Basic center of gravity (Fig. 1)

The basic center of gravity knob 12 drives a shaft 35 which controls the contact arm 36 of variable resistor 37, one end of which is connected to negative main N, said resistor being adapted to be set to a value proportional to the distance of the center of gravity of the basic weight from the reference datum of the aircraft, which, in the illustrative embodiment herein shown and described, is the nose of the aircraft.

Fuel weight (Fig. 1)

The fuel weight knob 13 drives a shaft 38 to which are ganged the contact arms 41, 42 and 43 of variable electrical resistors 44, 45 and 46, each of which will be set to a value proportional to the fuel weight, one end of resistor 46 being connected to positive main P.

Fuel center of gravity (Fig. 1)

The fuel center of gravity knob 14 drives a shaft 47 which controls the contact arm 48 of variable resistor 49, one end of which is connected to negative main N, said resistor being adapted to be set to a value proportional to the distance of the center of gravity of the fuel from the reference datum of the aircraft.

Take-off center of gravity (Fig. 1)

The take-off or final center of gravity knob 15 drives a shaft 51 which controls the contact arm 52 of variable resistor 53, one end of which is connected to negative main N, said resistor being adapted to be set to a value proportional to the distance of the desired final center of gravity of the loaded aircraft from the reference datum.

Cargo weight (Fig. 1)

The cargo weight knob 16 drives a shaft 54 to which are ganged the contact arms 55 and 56 of variable resistors 57 and 58, each of which will be set to a value proportional to the cargo weight to be loaded, one end of resistor 58 being connected to positive main P.

Predetermined gross moment bridge B–1 (Fig. 1)

The contact arm 29 of basic weight resistor 32 is connected by lead 61 to one end of fuel weight resistor 44 and the contact arm 41 of said resistor 44 is connected by lead 62 to one end of cargo weight resistor 57, the contact arm 55 of which is connected by lead 63 to junction 64 of predetermined gross moment bridge B–1 so that series connected resistors 32, 44 and 57 form one arm of said bridge. Also connected to junction 64 to form a second arm of bridge B–1 is one end of fixed resistor 65, the other end of which is connected to negative main N. Junction 66 of bridge B–1 is connected by lead 67 to contact arm 52 of final or take-off center of gravity resistor 53 and by lead 68 to the contact arm 69 of variable balancing resistor 71, one end of which is connected to positive main P so that resistors 71 and 53 form the third and fourth arms of bridge B–1.

The contact arm 69 is driven by the shaft 72 of servo-motor 73, the input of which is connected through the normally open contacts of relay 76, to servo-amplifier 77 connected between junctions 64 and 66 of bridge B–1 so that when bridge B–1 is balanced, resistor 71 will be set to a value proportional to the predetermined gross moment of the aircraft, i.e., the product of gross weight (resistors 32, 44, 57) and final desired center of gravity (resistor 53). The shaft 72 also drives the contact arm 78 of a variable resistor 79, one end of which is also connected to positive main P and said resistor 79 will also be set to a value proportional to such predetermined gross moment.

Basic moment bridge B–2 (Fig. 1)

The contact arm 31 of basic weight resistor 34 is connected by lead 81 to junction 82 of basic moment bridge B–2 to form one arm of said bridge. Also connected to junction 82 is one end of fixed resistor 83, the other end of which is connected to negative main N, said resistor 83 forming a second arm of said bridge B–2. Junction 84 of bridge B–2 is connected by lead 85 to contact arm 36 of basic center of gravity resistor 37 and by lead 86 to the contact arm 87 of variable balancing resistor 88, one end of which is connected to positive main P, so that resistors 88 and 37 form the third and fourth arms of bridge B–2. The contact arm 87 is driven by the shaft 89 of servo-motor 91, the input of which is connected through the normally open contacts of relay 94 to servo-amplifier 95 connected between junctions 82 and 84 of bridge B–2 so that when bridge B–2 is balanced, resistor 88 will be set to a value proportional to the basic moment of the aircraft, i.e., the product of basic weight (resistor 34) and basic center of gravity (resistor 37).

The shaft 89 also drives the contact arms 96 and 97 of variable resistors 98 and 99, one end of each of which is connected to positive main P and said resistors 98 and 99 will also be set to such basic moment.

Fuel moment bridge B–3 (Fig. 1)

The contact arm 43 of fuel weight resistor 46 is connected by lead 101 to junction 102 of fuel moment bridge B–3 to form one arm of said bridge. Also connected to junction 102 is one end of fixed resistor 103, the other end of which is connected to negative main N, said resistor 103 forming a second arm of bridge B–3. Junction 104 of bridge B–3 is connected by lead 105 to contact arm 48 of fuel center of gravity resistor 49 and by lead 106 to contact arm 107 of variable balancing resistor 108, one end of which is connected to positive main P, so that resistors 108 and 49 form the third and fourth arms of bridge B–3. The contact arm 107 is driven by the shaft 111 of servo-motor 112, the input of which is connected through the normally open contacts of relay 115 to servo-amplifier 116, connected between junctions 102 and 104 of bridge B–3 so that when bridge B–3 is balanced resistor 108 will be set to a value proportional to the fuel moment of the aircraft, i.e., the product of the fuel weight (resistor 46) and fuel center of gravity (resistor 49). Shaft 111 also drives the contact arms 117 and 118 of variable resistors 119 and 121 so that said resistors will also be set to the fuel moment.

Remaining moment bridge B–4 (Fig. 1)

The contact arm 78 of predetermined gross moment resistor 79 is connected by lead 122 to junction 123 of remaining moment bridge B–4 to form one arm of said bridge. One end of each of fixed resistors 124 and 125 is connected to junctions 123 and 126 respectively of bridge B–4 and the other ends of said resistors are connected to negative main N so that resistors 124 and 125 form the second and third arms of said bridge.

Junction 126 is connected by lead 127 to contact arm 128 of variable balancing resistor 129 to form part of the fourth arm of bridge B–4. The contact arm 128 is driven by the shaft 132 of servo-motor 133, the input of which is connected through the normally open contacts of relay 136 to servo-amplifier 137 connected between junctions 123 and 126 of bridge B–4. The shaft 132 also drives the contact arms 138, 138′ of variable resistors 139, 139′, one end of each of which is connected to positive main P so that resistors 129, 139 and 139′ will each be set to a value proportional to the remaining moment as hereinafter described.

*Planned weight to be loaded into compartments (Fig. 2)*

Means are provided to set into the equipment resistances of value proportional to the weight of cargo to be loaded into each of the compartments of the aircraft, and to be preloaded into predetermined stations of the aircraft and also to the distance from the reference datum of predetermined positions in each compartment and station.

In the illustrative embodiment, the equipment is shown for use with an aircraft having no more than thirteen compartments and having no more than two preload positions. It is of course to be understood that more compartments and more preload positions can be accommodated by mere addition of elements identical to those now to be described.

As shown in Fig. 2 of the drawings, a plurality of control knobs B through N inclusive and B' through N' inclusive are mounted on the front panel of the equipment related respectively to the plurality of compartments of the aircraft. As the circuits controlled by knobs B through N inclusive and B' through N' inclusive are identical, only the circuits associated with knobs B and B' will be described in detail. Each of the control knobs B through N has a shaft 141 which drives the contact arms 142, 143 and 144 of variable compartment weight resistors 145, 146 and 147. In addition, through suitable linkage, each of the shafts 141 drives an associated indicator BI through NI respectively, which also may be a Veeder Root counter.

Each of the control knobs B' through N' has a shaft 148 which drives the contact arm 149 of a variable resistor 151, which, for example, may be set to a value proportional to the distance of the centroid of the associated compartment into which weight is to be loaded, from the reference datum of the aircraft, illustratively the nose thereof. If desired, resistor 151 could be a fixed resistor of such value for each type aircraft.

In addition to the knobs B through N associated with the compartments of the aircraft, there are two knobs X and Y which may be set respectively to the weights to be preloaded into any two locations of the aircraft. Each of the control knobs X and Y has a shaft 153 which drives the contact arms 154, 155 and 156 of variable weight resistors 157, 158 and 159. In addition, through suitable linkage each of the shafts 153 drives an associated indicator XI and YI.

Associated with each of the control knobs X and Y is a control knob X' and Y' also mounted on the front panel of the equipment. Each of the control knobs X' and Y' has a shaft 161 which drives the contact arm 162 of a variable resistor 163 which may be set to a value proportional to the distance of the centroid of the position into which weight is to be loaded, from the reference datum of the aircraft. Through suitable linkage each of the shafts 161 drives an associated indicator X'I, Y'I.

One end of resistor 145 associated with knob B is connected to positive main P. The contact arm 142 of said resistor 145 is connected by lead 166 to one end of the corresponding resistor 145 (not shown) associated with knob C. The resistors 145 associated with knobs C through M inclusive are similarly connected in series and the contact arm 142 of resistor 145 associated with knob M is connected by lead 167 to one end of the resistor 145 associated with knob N. The contact arm 142 of said resistor 145 is connected by lead 168 to one end of the resistor 157 associated with knob X and the contact arm 154 of said resistor 157 is connected by lead 169 to one end of the resistor 157 associated with knob Y. Thus, all of the resistors 145 associated with knobs B through N inclusive and the resistors 157 associated with knobs X and Y respectively are connected in series.

*Remaining weight bridge B–5 (Fig. 1)*

The contact arm 154 of resistor 157 associated with knob Y is connected by lead 172 to one end of variable balancing resistor 173 of remaining weight bridge B–5 (Fig. 1). The contact arm 174 of resistor 173 is connected by lead 175 to junction 176 of bridge B–5, so that resistor 173 and series connected resistors 145 and 157 form one arm of said bridge. Also connected to junction 176 is one end of fixed resistor 177, the other end of which is connected to negative main N so that resistor 177 forms a second arm of bridge B–5. Connected to junction 178 of said bridge B–5 is one end of a fixed resistor 179, the other end of which is connected to negative main N, said resistor 179 forming a third arm of said bridge. Also connected to junction 178 as by lead 181 is the contact arm 56 of cargo weight resistor 58 which forms the fourth arm of bridge B–5.

The contact arm 174 of resistor 173 of bridge B–5 is driven by the shaft 182 of servo-motor 183, the input of which is connected through the normally open contacts of relay 186, to servo-amplifier 187 connected between junctions 176 and 178 so that when bridge B–5 is balanced, resistor 173 will be set to a value proportional to the remaining weight to be loaded into the aircraft (i.e., the difference between resistor 58 and the series connected resistors 145 and 157). The shaft 182 also drives the contact arms 188, 188' and 188'' of variable resistors 189, 189' and 189'', one end of each of resistors 189 and 189'' being connected to negative main N and one end of resistor 189' being connected to positive main P, said resistors 189, 189' and 189'' like resistor 173, all being set to values proportional to the remaining weight to be loaded into the aircraft.

In addition, the servo-motor 183 through a shaft 191 drives a pointer 192 associated with dial 25 so that the relation between the total cargo weight to be loaded and the remaining cargo weight to be loaded is visible throughout the loading procedure.

*True weight bridge B–6 (Fig. 1)*

The contact arm 30 of basic weight resistor 33 is connected by lead 194 to one end of fuel weight resistor 45. The contact arm 42 of resistor 45 is connected by lead 195 to one end of resistor 146 (Fig. 2) associated with knob B. The contact arm 143 of said resistor 146 is connected by lead 196 to one end of the corresponding resistor 146 (not shown) associated with knob C. The resistors 146 associated with knobs C through M inclusive are similarly connected in series and the contact arm 143 of resistor 146 associated with knob M is connected by lead 197 to one end of resistor 146 associated with knob N. The contact arm 143 of said resistor 146 is connected by lead 198 to one end of resistor 158 associated with knob X and the contact arm 155 of said resistor 158 is connected by lead 199 to one end of the resistor 158 associated with knob Y.

The contact arm 155 of resistors 158 associated with knob Y is connected by lead 201 to contact arm 169' of relay 171 (Fig. 1), which normally engages fixed contact 170 connected to junction 202 of true weight bridge B–6 so that the series connected resistors 33, 45, 146 and 158 associated respectively with the basic weight, the fuel weight, the weights loaded in compartments B through N inclusive and associated with the weights loaded in the predetermined stations respectively will form one arm of true weight bridge B–6. Also connected to junction 202 is one end of fixed resistor 203, the other end of which is connected to negative main N, said resistor 203 forming a second arm of said bridge B–6. Connected to junction 204 of bridge B–6 is one end of fixed resistor 205, the other end of which is connected to negative main N, said resistor 205 forming the third arm of said bridge. Also connected to junction 204 by lead 206 is the contact arm 207 of variable balancing resistor 208, one end of which is connected to positive main P, said resistor 208 forming the fourth arm of bridge B-6.

The contact arm 207 is driven by the shaft 209 of servo-motor 211, the input of which is connected through the normally open contacts of relay 214, to servo-amplifier 215 connected between junctions 202 and 204 of bridge B-6. Thus, when bridge B-6 is balanced, resistor 208 will be set to a value proportional to the true gross weight of the aircraft (i.e., the sum of resistors 33, 45, 146 and 158).

The servo-motor 211 also drives the pointer 218 of a true weight indicator 219 and the drive shaft 221 of a suitable printer 222 so that the true weight may be both visually indicated and permanently recorded.

*Moment of the planned weight for each compartment (Figs. 2 and 4)*

Associated with each of the knobs B through N inclusive and X, Y respectively (Fig. 2) are servo-motors 223 and 224. The shaft 225 of each of the servo-motors 223 drives the contact arms 226, 227 and 228 of variable resistors 229, 230 and 231 and the shaft 232 of each of the servo-motors 224 drives the contact arms 233, 234 and 235 of variable resistors 236, 237 and 238.

Each of the knobs B through N inclusive, X and Y controls the movable arms 241, 242, 243 and 244 of four switches 245, 246, 247 and 248 which contact arms are normally spaced from the associated fixed contacts 249, 250, 251 and 252.

The contact arm 241 associated with knobs B through N, is connected by an associated lead 262 to the contact arm 149 of resistor 151. The contact arms 242 and 243 are connected to the contact arms 144 and 226 of resistors 147 and 229 and the contact arms 244 is connected to the input of servo-motor 223.

The switches 245, 246, 247, 248 of knobs B through N inclusive, when closed by the pressing of the associated knob, will make the following connections:

(a) the contact arm 149 of resistor 151 is connected through closed switch 245 to junction 281 of compartment moment bridge B-7 (Fig. 4).

(b) the contact arm 144 of resistor 147 is connected through the closed contacts of switch 246 to junction 282 of bridge B-7. Also connected to junction 282 is one end of fixed resistor 283, the other end of which is connected to negative main N.

(c) the contact arm 226 of balancing resistor 229 is connected through the closed contacts of switch 247 to junction 281 of bridge B-7.

(d) the input of the associated servo-motor 223 is connected through the closed contacts of switch 248 to the servo-amplifier 284 of bridge B-7, said servo-amplifier being connected between junctions 281 and 282.

The contact arms 241 associated with the respective knobs X and Y are connected each by an associated lead 263 to the contact arm 162 of resistor 163. The contact arms 242 and 244 are connected to the contact arms 156 and 233 of resistors 159 and 236 and the contact arm 243 is connected to the input of servo-motor 224.

The switches controlled by the knobs X and Y will perform the following functions when closed.

(a) the contact arm 162 of resistor 163 is connected through the closed contacts of associated switch 245 to junction 281 of bridge B-7.

(b) the contact arm 156 of resistor 159 is connected through the closed contacts of switch 246 to junction 282 of bridge B-7.

(c) the contact arm 233 of balancing resistor 236 is connected through the closed contacts of switch 248 to junction 281 of bridge B-7.

(d) the input of the associated servo-motor 224 is connected through the closed contacts of switch 247 to the servo-amplifier 284 of bridge B-7.

Thus, when bridge B-7 is in balance for each of the compartments B through N and for the predetermined stations X and Y, the associated servo-motors 223 and 224 respectively will set the related resistor 229 and 236 to a value proportional to the product of the weight to be loaded into the associated compartment or predetermined station and the arm of such weight, determined by the setting of resistors 151 and 163 respectively, or to the moment of the weight in the compartment or station.

In addition, the resistors 230 and 231 associated with compartments B through N and the resistors 237 and 238 associated with knobs X and Y will also be set by the associated shafts 225, 232 to such value.

*Remaining moment bridge B-4 (Figs. 1 and 2)*

To complete the remaining moment bridge B-4 previously described, the contact arm 96 of basic moment resistor 98 is connected by lead 286 to one end of fuel moment resistor 119, the contact arm 117 of which is connected by lead 287 to one end of resistor 230 (Fig. 2) associated with compartment knob B. The contact arm 227 of said resistor 230 of compartment B is connected by lead 288 to one end of the resistor 230 (not shown) associated with knob C. The resistors 230 associated with knobs C through M inclusive are similarly connected in series with the contact arm 227 of the resistor 230 associated with knob M which is connected by lead 289 to one end of the resistor 230 associated with knob N. The contact arm 227 of said resistor 230 associated with knob N is connected by lead 291 to the end of resistor 237 associated with knob X and the contact arm 234 of resistor 237 is connected by lead 292 to one end of resistor 237 associated with knob Y. The contact arm 234 of resistor 237 associated with knob Y is connected by lead 293 to one end of resistor 129 of remaining moment bridge B-4 (Fig. 1).

Thus, when bridge B-4 is in balance, resistor 129 will be set to a value proportional to the difference between the predetermined gross moment (resistor 79) and the sum of the basic moment, the fuel moment and the moments of the weights loaded in each compartment and in the pre-load positions (resistors 98, 119, series connected resistors 230 and resistors 237). In addition, resistors 139 and 139' of bridge B-4 will be set by shaft 132 of bridge B-4 to a value proportional to such remaining moment.

*Center of gravity bridge B-8 (Fig. 1)*

The contact arm 97 of basic moment resistor 99 is connected by lead 294 to one end of fuel moment resistor 121, the contact arm 118 of which is connected by lead 295 (Fig. 2) to one end of resistor 231 associated with knob B. The contact arm 228 of said resistor 231 is connected by lead 296 to one end of resistor 231 (not shown) associated with knob C. The resistors 231 associated with knobs C through M inclusive are similarly connected in series and the contact arm 228 of resistor 231 associated with knob M is connected by lead 298 to one end of the resistor 231 associated with knob N. The contact arm 228 of said resistor 231 associated with knob N is connected by lead 299 to one end of the resistor 238 associated with knob X and the contact arm 235 of said resistor 238 associated with knob X is connected by lead 301 to one end of resistor 238 associated with knob Y.

The contact arm 235 of resistor 238 associated with knob Y is connected by lead 302 (Fig. 1) to junction 303 of center of gravity bridge B-8 to form one arm of said bridge. Also connected to said junction 303 of bridge B-8 by lead 304 is the fixed contact 253 of relay 171 from which the contact arm 169' is normally spaced when relay 171 is not energized. The fixed contacts 254, 255 of relay 171 are connected respectively to one end of the coils of relays 214, 315 of bridges B-6 and B-8, the contact arm 256 of relay 171 normally engaging fixed contact 254.

One end of a fixed resistor 305 is connected to junction 306 of bridge B-8, the other end of said resistor being connected to negative main N. Also connected to junction 306 is by lead 307 is the contact arm 308 of variable balancing resistor 309, one end of which is connected to positive main P. The contact arm 308 is driven by the shaft 311 of servo-motor 312, the input of which is connected through the normally open contacts of relay 315 to servo-amplifier 316 connected between junctions 303 and 306 of bridge B-8.

Thus when relay 171 is energized in the manner hereinafter described and bridge B-8 is balanced, variable balancing resistor 309 will be set to a value proportional to the distance of the center of gravity of the aircraft from the reference datum, i. e., the quotient of the sum of series connected moment resistors 99, 121, 231, and 238 divided by the value of series connected resistors 33, 45, 146 and 158, the true gross weight of the aircraft.

The shaft 311 driven by servo-motor 312 also drives a printer 317 as well as the pointer 318 associated with a dial 319 so that a visual indication as well as a printed record of the center of gravity of the aircraft at any time will be given.

*Bridge B-9, load slope (SL)* $\left(SL=\dfrac{RM}{RW}\right)$ *(Fig. 3)*

The contact arm 138' of remaining moment resistor 139' (Fig. 1) is connected by lead 321 to junction 322 of true load slope bridge B-9 (Fig. 3). Also connected to junction 322 by lead 323 is the contact arm 188'' (Fig. 1) of remaining weight resistor 189''. Connected to junction 324 of bridge B-9 is one end of fixed resistor 325, the other end of which is connected to negative main N. Also connected to junction 324 as by lead 326 is the contact arm 327 of variable balancing resistor 328, one end of which is connected to positive main P.

The contact arm 327 is driven by the shaft 331 of servo-motor 332, the input of which is connected through the normally open contacts of relay 335 to servo-amplifier 336 connected between junctions 322 and 324 of bridge B-9.

Thus, when bridge B-9 is balanced, variable balancing resistor 328 will be set to a value proportional to the quotient (SL) of remaining moment divided by remaining weight, before loading of the next compartment in the sequence to be loaded.

The shaft 331 driven by servo-motor 332 also drives the contact arm 338 of variable resistor 339 which will also be set to a value proportional to the load slope SL, one end of said resistor 339 being connected to positive main P.

*Bridge B-10 (Sφ—SL) (Fig. 3)*

The contact arm 338 of resistor 339 of bridge B-9 is connected by lead 341 to one end of variable balancing resistor 342 of bridge B-10 which determines the difference between the quotient (Sφ) of the sum of the given moments of all compartments in a sequence omitting the first compartment, divided by the given weights for such compartments and the load slope SL. Connected to junction 343 of bridge B-10 is one end of fixed resistor 344, the other end of which is connected to negative main N. Also connected to junction 343 as by lead 345 is the contact arm 346 of variable resistor 347, one end of which is connected to positive main P.

Connected to junction 348 of bridge B-10 is one end of fixed resistor 349, the other end of which is connected to negative main N. Also connected to junction 348 as by lead 351 is the contact arm 352 of variable balancing resistor 342. The contact arm 352 is driven by the shaft 353 of servo-motor 354, the input of which is connected through the normally open contacts of relay 357 to servo-amplifier 358 connected between junctions 343 and 348 of bridge B-10.

The shaft 353 driven by servo-motor 354 also drives the contact arm 359 of variable resistor 361, one end of which is connected to negative main N and which will be set to a value related to that of the resistor 342.

*Computed load bridge B-11 (CL) (Fig. 3)*

The contact arm 359 is connected by lead 362 to junction 363 of bridge B-11 which determines the weight (CL) to be loaded into the compartment. The junction 364 of bridge B-11 is connected by lead 365 to the contact arm 188' (Fig. 1) of resistor 189', which is set to a value proportional to the remaining weight.

Junction 364 (Fig. 3) is also connected by lead 366 to the contact arm 367 of variable resistor 368 of bridge B-12, one end of said resistor being connected to negative main N.

Junction 363 of bridge B-11 is connected by lead 369 to the contact arm 371 of balancing resistor 372, one end of which is connected to positive main P. The contact arm 371 is driven by the shaft 373 of servo-motor 374, the input of which is connected through the normally open contacts of relay 377 to servo-amplifier 378 connected between junctions 363 and 364 of bridge B-11. The shaft 373 driven by servo-motor 374 also drives the contact arm 379 of variable resistor 381, one end of which is connected to negative main N to set the latter to a value related to the value of resistor 372.

*Bridge B-12 (Sφ—SC) Fig. 3*

Connected to junctions 384, 385 of bridge B-12 which determines the difference between Sφ above defined and the quotient (SC) of the given moment divided by the given weight of the first compartment in the sequence, is one end of fixed resistors 386, 387 respectively, the other end of said resistors being connected to negative main N. Also connected to junction 384 by lead 388 is the contact arm 389 of variable resistor 391 of bridge B-13, which determines the value of Sφ, one end of said resistor 391 being connected to positive main P. Connected by lead 392 to junction 385 of bridge B-12 is the contact arm 393 of balancing resistor 394. The contact arms 367 and 393 of variable resistors 368 and 394 are driven by shaft 395 of servo-motor 396, the input of which is connected through the normally open contacts of relay 399 to servo-amplifier 401 connected between junctions 384 and 385 of bridge B-12. Thus, when bridge B-12 is in balance, resistors 394 and 368 will be set to the same value.

*Bridge B-13 (Sφ) Fig. 3*

Connected to junction 402 of bridge B-13 is one end of fixed resistor 403, the other end of which is connected to negative main N. Also connected to junction 402 as by lead 404 is the contact arm 405 of variable balancing resistor 406, one end of which is connected to positive main P.

The contact arms 389, 346 and 405 of resistors 391, 347 and 406 are driven by the shaft 407 of servo-motor 408, the input of which is connected through the normally open contacts of relay 412 to servo-amplifier 413 connected between junctions 402 and 414 of bridge B-13. Thus, when bridge B-13 is in balance, the resistors 406, 347 and 391 will be set to the same value.

*Fixed compartment weight and moment switching circuit (Figs. 6 and 7)*

The weight and moment switching circuits shown in Figs. 6 and 7 comprise a plurality of switches corresponding in number to the number of compartments in the largest aircraft to be handled by the equipment, thirteen switches being illustratively shown and designated 421 to 433 inclusive associated with the compartments B through N respectively. Each of the switches has a movable contact arm 437 connected to positive main P and controlled by a pushbutton designated PB through PN respectively. The movable arms 437 are normally spaced from a fixed contact 438 which are connected respectively by leads 439, 441 to associated contacts B through N respectively of a rotary switch S–1. The switch S–1 (Fig. 7) has a sector shaped contact member 442 driven by a shaft 443, said contact member upon rotation in a clockwise direction from the position shown in Fig. 7, being adapted successively to engage one or more of the contacts B through N and being one contact behind, i.e., when shaft 443 is set to C position member 442 only engages contact B.

The fixed contacts 438 of each of the switches 421 to 433 respectively are also connected by leads 439 to one end of a coil 444 of an associated relay RL–1 to RL–13 inclusive, the other side of each of said coils 444 being connected to common main 445 which in turn is connected to negative main N.

The relays RL–1 through RL–13, which are identical, each has eight movable contact arms 446 to 453 inclusive which, when the associated relay is de-energized, normally engage associated fixed contacts 446a to 453a inclusive and are spaced from associated fixed contacts 446b to 453b inclusive. The movable contact arm 446 of each of said relays is connected to positive main P.

The fixed contact 446a, 449a, 450a and 453a of each of the relays is open circuited. The fixed contacts 446b of each of the relays is connected by associated lead 454 to one side of an indicating lamp 455 associated with each of the pushbuttons PB through PN, the other side of said lamp being connected to negative main N.

The fixed contact 449b and 453b of each of said relays is connected by leads 456, 457 respectively to the movable contact arm 458, 459 of associated switch 461, 462 respectively, the contact arms 458, 459 of switches 461, 462 associated with relay RL–1 being connected also to positive main P and negative main N respectively. The contact arms 458, 459 are all ganged together on a common shaft (not shown) to move in unison.

*Fixed compartment weight and moment resistors 466, 467 (Figs. 6, 7)*

Each of the switches 461, 462 has two fixed contacts 463 and 464, the associated contact arm 458, 459 normally engaging one of said contacts. Connected to the contacts 463 and 464 of each of the switches 461, 462 associated with relays RL–1 through RL–13 is one end of a fixed resistor 466, 467 respectively the other ends of said resistors being connected together and thence connected by lead 468, 469 to contact 447a, 451a of each of the relays RL–1 through RL–13 inclusive. Each of the resistors 466, 467 associated with switch 462 is of value proportional to a given weight capacity of the associated compartment, illustratively the maximum weight capacity, and each of the resistors 466, 467 associated with switch 461 is of value proportional to the corresponding maximum moment capacity of the associated compartment.

The contact arms 458, 459 of each of the switches 461, 462 is connected to an associated terminal X, X' respectively and each of the leads 468, 469 is connected to an associated terminal Y, Y'.

The contact arms 447, 451 of each of the relays RL–1 through RL–13 is connected by an associated lead 471, 472 to the contact 447b, 451b of the next succeeding relay and the contact arms 447, 451 of relays RL–13 are connected by the associated leads 471, 472 to terminals T1, T2.

The contacts 447b, 448, 448a, 448b, 449a, 450a, 451b, 452, 452a, 452b and 453a of relay RL–1 are open circuited. The contact arms 449, 453 of relay RL–1 to RL–13 are connected by lead 473, 474 to leads 468, 469. The contacts 448b, 452b of relay RL–2 are open circuited. The contact arms 448, 452 of relays RL–2 to RL–12 are connected by leads 475, 476 to the contact 448b, 452b of the next succeeding relay and the contact arms 448, 452 of relay RL–13 are connected by the associated leads 475, 476 to terminals T–3, T–4.

The contacts 448a, 452a of each of the relays RL–2 through RL–13 is connected by leads 477, 478 to the associated lead 468, 469 of the immediately preceding relay and lead 456 of each of the relays RL–2 to RL–13 is connected by lead 479 to lead 468 of the immediately preceding relay.

*Compartment weight resistors FC–B to FC–M (Figs. 6, 7)*

Associated with each of the relays RL–1 through RL–13 is a fixed resistor FC–B through FC–N respectively, the purpose of which will be hereinafter described, said resistors being connected in series, with one end of the series connected resistors connected to terminal T–5 and the other to terminal T–6. The contacts 450, 450b of each of the relays RL–1 through RL–13 are connected respectively by leads 481, 482 to the opposite end of the associated resistors FC–B through FC–N so that said resistors may be short circuited by their associated relays RL–1 through RL–14.

*Fixed compartment weight and load slope (SC) switching circuit (Figs. 8, 9)*

In addition to the relays RL–1 through RL–13 inclusive, as shown in Figs. 8 and 9, thirteen further relays RL–14 through RL–26 are also provided. Each of the relays has a coil 485, one end of which is connected to negative main N and the other ends of which are connected respectively by leads 486 to an associated fixed contact B through N respectively of a rotary selector switch S–2. The switch S–2 has a contact arm 487 connected to terminal T–7 that is ganged to move with segment 442 of switch S–1 and adapted to successively engage the fixed contacts B through N.

Each of the relays RL–14 through RL–26 inclusive has four movable contact arms 488, 489, 490 and 491 which normally engage associated fixed contacts 488a, 489a, 490a and 491a and are spaced from associated fixed contacts 488b, 489b, 490b and 491b, when the coil of the associated relay is not energized.

The fixed contact 488b of each of the relays is connected by lead 492 to the contact arm 493 of a switch 494 associated with each of the relays RL–14 through RL–26. Each of the switches 494 has two fixed contacts 495, 496, the associated contact arm 493 normally engaging one of said contacts. The contact arms 493 of each of the switches 494 is ganged to move in unison with the contact arms 458 and 459 of switches 461 and 462 and said contact arms 493, 458 and 459 are controlled by aircraft selector switch 416 which has a contact arm 417 movable from aircraft type DC–4 to aircraft type DC–6 position. In the former position the contact arm 417 which is connected to positive main P engages fixed contacts 418 connected by leads 419 respectively to the coils of relays RL–12 and RL–13.

*Fixed compartment weight resistors 497, 498 (Figs. 8, 9)*

Connected to the contacts 496 of each of the switches 494 is one end of a fixed resistor 498 and connected to the contacts 495 of the switches 494 associated with relays RL–14 through RL–24 is one end of a fixed resistor 497, said resistors illustratively being of ohmic value proportional to the maximum weight that can be loaded into the associated compartment of the selected type aircraft. The other end of all of the resistors 497, 498 are connected to common main 499 which in turn is connected to terminal T–8. In addition, the fixed contacts 495 of relays RL–25, RL–26 are also connected to common main 499.

The contact arm 488 of each of the relays RL–14 through RL–26 is connected to negative main N and the fixed contact 488a of each of the relays is open circuited, as are the fixed contacts 489a, 490a and 491a. The fixed contacts 489b and 490b of each of the relays RL–14 through RL–26 is connected respectively to the terminals X and X' associated with the relays RL–1 through RL–13 respectively and the contact arms 489, 490 of each of the relays RL–14 through RL–26 is connected to the terminals Y and Y' of each of the relays RL–1 through RL–13 so that resistors 466, 467 may be short circuited in the manner hereinafter described.

The fixed contact 491b of each of the relays RL–14 through RL–26 is connected to negative main N. The contact arm 491 of each of said relays is connected by an associated lead 501 to the contact arm 502 of an associated switch 503, said arm 502 being ganged with contact arms 458, 459, 493 and 417.

*Compartment load slope (SC) resistors 506, 507*

Each of the switches 503 has two fixed contacts 504 and 505, the associated contact arm 502 normally engaging one of said contacts. Connected to the contacts 505 of each of the switches 503 is one end of a fixed resistor 507 and connected to the contacts 504 of the switches 503 associated with relays RL–14 through RL–24 is one end of a fixed resistor 506, said resistors 506, 507 illustratively being of ohmic value related to the quotient of the moment of the maximum weight that can be carried in the associated compartment divided by the corresponding weight, i.e., to the slope SC of the associated compartment of the selected type aircraft. The other end of each of said fixed resistors 506, 507 (as well as the contacts 504 of the switches 503 associated with relays RL–25 and RL–26) are connected to common main 508 which in turn is connected to terminal T–9 and to one end of variable resistor 394 of bridge B–12.

*Timer circuit (Figs. 10, 11 and 12)*

The sequence of operations of the equipment heretofore described is, in the illustrative embodiment herein shown, controlled by means of a timer T (Figs. 10, 11 and 12) which comprises a motor M (Fig. 10), one side of which is connected to negative main N and having a shaft 511 of conducting material on which are mounted a plurality of cams illustratively fifteen in number and designated C–1 through C–15 inclusive. Associated with each of the cams is a wiper arm designated W–1 through W–15 inclusive, which wiper arms will be engaged by the associated cam to complete a circuit for a predetermined length of time depending upon the configuration of the associated cam.

The conducting shaft 511 to which all of the cams are electrically connected, is connected by a lead 512 to a common main 513 to which all of the contacts B through N of a rotary master control switch S–3 are connected. In addition to the contacts B through N, the switch S–3 has three contacts designated "off," "check" and "preload" positioned in advance of the contact B and an additional contact designated "hold" positioned after the last compartment N. The switch S–3 has a contact arm 514 connected to positive main P which is ganged to rotate with the shafts of switch S–1 and S–2 so that the contact arms of the switches S–1 through S–3 will rotate in unison. Associated with the contact arm 514 is an annular conducting member 515 which will be engaged by the contact arm 514 in the "check" position, "pre-load" position, compartments B through N positions and in the "hold" position, said member 515 being connected to contact arm 256 of relay 171 (Fig. 1). The switch S–3 also has an additional contact 516 connected to the coils of relays 76, 94, 115 of bridge B–1, B–2 and B–3 (Fig. 1) and which is engaged by the contact arm 514 when the latter is in the "check" position.

*Starting and readjust relay circuit (Fig. 10)*

The common main 513 associated with master control switch S–3 is connected by lead 521 to the contact arm 522 of relay 523, said contact arm 522 normally engaging fixed contact 524 when the coil 525 of the relay is not energized and being spaced from an associated fixed contact 526 which is open circuited. One end of coil 525 is connected to the negative main and the other end of said coil is connected by lead 527 to wiper arm W–16 which is associated with a cam C–16. The cam C–16 is mounted on a conducting shaft 528 driven by motor M', said shaft also mounting cams C–17 and C–18, each having an associated wiper arm Y–17 and W–18.

One side of motor M' is connected to negative main N and the other side of said motor is connected by lead 529 to one side of computing indicator lamp 531, the other side of which is connected to negative main N. Lead 529 is connected by lead 532 to wiper arm W–18 and by lead 533 to the contact arm 534 of a pushbutton switch 535, said contact arm 534 being normally spaced from fixed contact 536 connected by lead 537 to the conducting shaft 528 and to positive main P.

The fixed contact 524 of relay 523 is connected by lead 538 to one side of coil 539 of relay 541 and also by leads 542 and 543 to fixed contact 544 and contact arm 545 of relays 546, 547 respectively, contact arm 545 normally engaging fixed contact 550 which is open circuited. The other side of coil 539 of relay 541 is connected by lead 548 to the fixed contact 549 of relay 547. The relay 541 has a contact arm 551 normally engaging fixed contact 552 when coil 539 is not energized and spaced from fixed contact 553 which is connected to positive main P, said contact arm 551 being connected by lead 554 to fixed contact 555 of relay 546. Relay 546 has three contact arms 556, 557, 558 normally engaging fixed contacts 559, 560 and 555 when the coil 561 is not energized and spaced from fixed contacts 544, 562 and 563. The contacts 559 and 562 are open circuited. Contact arm 557 is connected to negative main N and contact 563 is connected to positive main P.

Contact arm 556 of relay 546 is connected by lead 564 to one side of the coil 565 of relay 547 and to fixed contact 566 of said relay 547. The other side of coil 565 is connected to negative main N. Fixed contact 560 of relay 546 is connected by lead 567 to contact arm 568 of relay 547 which is normally engaging fixed contact 549 and spaced from fixed contact 569 which is open circuited. One end of the coil 561 of relay 546 is connected to negative main N and the other end of said coil is connected by lead 571 to one side of computing indicating lamp 572 and thence to the wiper arm W–1. The other side of lamp 572 is connected to negative main N.

The wiper arm W–2 is connected to one side of the coils of relays 136 and 186 of bridges B–4 and B–5 (Fig. 1), the other side of said coils being connected to negative main N. Wiper arms W–3 and W–5 to W–13 (Figs. 11 and 12) inclusive are connected respectively to one side of the coil 573 of an associated relay 574 through 583 respectively, the other side of said coils being connected to negative main N. The wiper arm W–14 (Fig. 12) is connected to one side of the coil of relay 171 (Fig. 1), the other side of said coil being connected to negative main N. Also connected to the coil of relay 171 is the contact arm of normally open switch 584, the fixed contact of which is connected to positive main P.

Each of the relays 574 through 583 (Figs. 11, 12) has two contact arms 586 and 587 which normally engage open circuited fixed contacts 588, 589 and are spaced from fixed contacts 591, 592 when the coil 573 of the associated relay is not energized. In addition, each of the relays 576, 578, 580 and 581 has an additional contact arm 593 normally engaging open circuited fixed contact 594 and spaced from fixed contact 595. Relay 578 has an additional contact arm 596 normally engaging open circuited contact 597 and spaced from fixed contact 598. Relay 581 has three additional contact arms 599, 600, 601 normally engaging open circuited contacts 602, 603 and 604 and spaced from fixed contacts 605, 606 and 607 respectively.

Fixed contact 591 of relay 574 is connected by lead 607' to one side of the coil of relay 608 which is one of a bank of sixteen relays designated 608 through 623 inclusive, the other side of the coils of said relays being connected to negative main N.

Contact 591 of relay 574 is also connected by leads 607′ and 624 (Fig. 10) to the fixed contacts 591 of relays 578 (Fig. 11) and 581 (Fig. 12). Contact arm 586 of relay 574 is connected by lead 625 to contact arm 587 of relay 574 and to the contact arms 586, 587 of relays 575 through 583 inclusive as well as to the contact arms 593 of relays 576, 578, 580 and 581 and the contact arm 596 of relay 578 and the contact arms 599 and 600 of relay 581. Lead 625 is also connected to wiper arm W–15 of cam C–15.

Fixed contact 591 of relays 575, 577, 579 and 582 are connected by associated leads 626 through 629 respectively to one side of the coils of relays 614, 615, 616 and 621 respectively. The fixed contact 592 of relay 574 is connected by lead 630 to one side of the coil of relay 610 (Fig. 10). The fixed contacts 592 of relays 578 and 581 are connected by lead 631 to one side of the coil of relay 609 and the fixed contact 592 of relay 583 is connected by lead 632 to one side of the coil of relay 619. The fixed contacts 595 of relays 578, 581 are connected by lead 633 to one side of the coil of relay 612; the fixed contact 595 of relay 580 is connected by lead 634 to one side of the coils of relays 622 and 623; the fixed contact 605 of relay 581 is connected by lead 635 to one side of the coil of relay 613; and the fixed contact 606 of relay 581 is connected by lead 636 to one side of the coil of relay 620. The fixed contact 592 of relay 575 is connected by lead 637 to fixed contacts 592 of relays 577, 579 and 582. Lead 637 is also connected to terminal T–10 which is connected to the fixed contact 639 of discriminator switch 640 of discriminator bridge B–14.

*Discriminator bridge B–14 (Fig. 1)*

Switch 640 has a contact arm 641 which is normally spaced from fixed contact 639 and is adapted to be moved thereagainst by the switch arm 642 driven by the servo-motor 643 of bridge B–14. The servo-motor 643 is connected through the normally open contacts of relay 646 to the output of servo-amplifier 647 connected across terminal 648 and 649 of bridge B–14. The servo-motor 643 has conventional reversing terminals connected to the normally open contacts of a relay 653.

Associated with cam C–4 (Fig. 11) which has three segments *a*, *b* and *c* spaced approximately 120 degrees apart, is wiper arm W–4 connected by lead 654 to fixed contact 592 of relay 576 and to contact arm 638 of relay 644 which is normally engaging fixed contact 645. One side of the coil of relay 644 is connected to negative main N and the other side of the coil is connected by lead 650 to fixed contact 607 of relay 581, the associated contact arm 601 of which is normally spaced therefrom.

Fixed contact 591 of relay 576 is connected to one side of the coil of relay 653 of discriminator bridge B–14, (Fig. 1) the other side of said coil being connected to negative main N. Fixed contact 592 of relay 580 is connected to terminal T–7 of switch S–2. Fixed contact 591 of relay 583 is connected to one side of the coil of relay 655 of load director bridge B–15.

*Load director bridge B–15 (Fig. 5)*

A pair of fixed resistors 656 and 657 are connected respectively at one end to terminals 658 and 659 of bridge B–15, the other ends of resistors 656 and 657 being connected to negative main N and positive main P respectively. The bridge B–15 has a variable balancing resistor 661, the contact arm 662 of which is driven by the shaft 663 of servo-motor 664, the input of which is connected through the normally open contacts of relay 655 to the output of servo-amplifier 667 connected between junctions 658 and 659 of bridge B–15. The shaft 663 of servo-motor 664 also drives the pointer 668 associated with a dial 669 to indicate the weight to be loaded into the compartments.

Referring back to Figs. 10, 11 and 12 each of the relays 608 through 623 inclusive has a movable contact arm 671 normally engaging fixed contact 672 when the coil of the relay is not energized, and spaced from fixed contact 673. The relay 618 has an additional contact arm 674 normally engaging fixed contact 675 and spaced from fixed contact 676. Fixed contact 673 of relay 608 is connected by lead 677 to contact arm 671 of relay 612. Contact arm 671 of relay 608 is connected to junction 649 of bridge B–14. Fixed contact 672 of relay 608 is connected to terminal T–3 of Fig. 7. Fixed contact 673 of relay 609 is connected to one end of resistor 665, the other end of which is connected to positive main P. Contact arm 671 of relay 609 is connected to junction 648 of discriminator bridge B–14. Fixed contact 672 of relay 609 is connected to contact arm 138 of resistor 139 of remaining moment bridge B–4. Fixed contact 673 of relay 610 is connected by lead 678 to fixed contact 672 of relay 623. Contact arm 671 of relay 610 is connected by lead 679 to fixed contact 672 of relay 613. Fixed contact 672 of relay 610 is connected to terminal T–4 on Fig. 7. Fixed contact 673 of relay 611 is connected by lead 685 to fixed contact 675 of relay 618. Contact arm 671 of relay 611 is connected to contact arm 138 of resistor 189 of remaining weight bridge B–5. Fixed contact 672 of relay 611 is connected by lead 686 to fixed contact 672 of relay 620. Fixed contact 673 of relay 612 is connected to one end of resistor 666, the other end of which is connected to positive main P. Fixed contact 672 of relay 612 is connected by lead 687 to fixed contact 672 of relay 622. Fixed contact 673 of relay 613 is connected to terminal T–8 of Fig. 9. Contact arm 671 of relay 613 is connected to junction 649 of discriminator bridge B–14. Fixed contact 673 of relay 614 is connected by lead 688 to one side of the coil 689 of "shift to next compartment" relay 691 which is one of a bank of five relays numbered 691 through 695 inclusive.

Contact arm 671 of relay 614 is connected by lead 696 to the contact arms 671 of relays 615, 616, 621 as well as to the contact arm 641 of discriminator switch 640 of discriminator bridge B–14 of Fig. 1. Fixed contact 673 of relay 615 is connected by lead 697 to one side of the coil 689 of "take out last compartment" relay 692. Fixed contact 673 of relay 616 is connected by lead 690 to one side of the coil of "maximum compartment load" relay 693. Fixed contact 673 of relay 617 is connected to terminal T–8 of Fig. 9. Contact arm 671 of relay 617 is connected to junction 658 of load director bridge B–15. Fixed contacts 673 and 676 of relay 618 are connected respectively to one end of resistors 698 and 699 associated with load director bridge B–15, the other end of said resistors being connected to negative main N. The contact arm 671 of relay 618 is connected to one end of resistor 661 of bridge B–15 and the fixed contact 672 is connected to negative main N. Contact arm 674 of said relay 618 is connected to junction 658 of bridge B–15.

Contact arm 671 of relay 619 is connected to the contact arm 379 of variable resistor 381 of bridge B–11. The fixed contact 672 normally engaged by said contact arm 671 is connected by lead 701 to fixed contact 673 of relay 620. The contact arm 671 of said relay 620 is connected to junction 648 of discriminator bridge B–14. Fixed contact 673 of relay 621 is connected by lead 704 to one side of the coil 689 of relay 695. Fixed contact 673 of relay 622 is connected to junction 414 of bridge B–13, the contact arm 671 of relay 622 being connected to terminal T–1 (Fig. 7). Fixed contact 673 of relay 623 is connected to junction 414 of bridge B–13 and the contact arm 671 of relay 623 is connected to terminal T–2 (Fig. 7).

Each of the relays 691 through 695 has three contact arms 705, 706 and 707 normally engaging fixed contacts 708, 709 and 710 and spaced from fixed contacts 711, 712 and 713. As shown, the contacts 708, 709 and 713 of all of the relays are open-circuited. In addition to the foregoing, the relays 691 through 694 inclusive each has two additional contact arms 714 and 715 normally engaging fixed contacts 716 and 717 and spaced from fixed contacts 718 and 719. The contact 718 of each of the relays 691 through 694 is open-circuited, as is the contacts 719 of each of said relays. Relays 693 and 694 each has an additional contact arm 721, normally engaging fixed contact 722 and spaced from fixed contact 723, the contact 723 of relay 693 and 722 of relay 694 being open-circuited and the contact 723 of relay 694 being connected by lead 720 to contact arm 601 of relay 581.

Fixed contact 711 of relay 691 is connected to coil 689 of such relay and also by lead 724 to one side of "switch to next compartment" lamp 725, the other side of said lamp being connected to negative main N. Contact arm 705 of relay 691 is connected to contact arm 706 of said relay and thence by lead 726 to contact arms 705, 706 of relays 692, 693 and 695, contact arms 705 and 721 of relay 694 and thence to wiper W-15 of cam C-15.

Fixed contact 712 of relay 691 is connected by lead 727 to one side of the coil of relay 618 and by lead 728 to fixed contact 712 of relay 692. Contact arm 707 of relay 691 is connected by lead 729 to junction 658 of load director bridge B-15. Fixed contact 710 of relay 691 is connected by lead 731 to contact arm 707 of relay 692. Contact arm 714 of relay 691 is connected by lead 732 to one side of the coils of relays 335, 357, 377, 399 and 412 of bridges B-9, B-10, B-11, B-12 and B-13, the other side of said coils being connected to negative main N. Fixed contact 716 of relay 691 is connected by lead 733 to contact arm 714 of relay 692.

Contact arm 715 of relay 691 is connected by lead 734 to one side of the coil of relay 646 of discriminator bridge B-14, the other side of said coil being connected to negative main N. Fixed contact 717 of relay 691 is connected by lead 735 to contact arm 715 of relay 692. Fixed contact 710 of relay 692 is connected by lead 736 to contact arm 714 of relay 693. Fixed contact 716 of relay 692 is connected by lead 737 to contact arm 715 of relay 693. Fixed contact 717 of relay 692 is connected by lead 738 to contact arm 721 of relay 693. Fixed contact 711 of relay 692 is connected by lead 739 to one side of "take out last compartment" indicating lamp 741, the other side of said lamp being connected to negative main N. Lead 739 is also connected by lead 742 to fixed contact 717 of relay 694.

Fixed contact 711 of relay 693 is connected to one side of the coil of relay 693 and thence by lead 743 to one side of "maximum compartment load lamp" 744, the other side of which is connected to negative main N. Fixed contact 712 of relay 693 is connected to terminal T-7 of switch S-2 (Fig. 9) and also by lead 745 to one side of the coil of relay 617. In addition, lead 745 is also connected by lead 746 to fixed contact 712 of relay 695 which is also connected to terminal T-7. Contact arm 707 of relay 693 is connected by lead 747 to one side of the coil of relay 611. Fixed contact 710 of relay 693 is connected by lead 748 to fixed contact 712 of relay 694. Fixed contact 716 of relay 693 is connected by lead 749 to contact arm 707 of relay 694. Fixed contact 717 of relay 693 is connected by lead 751 to contact arm 714 of relay 694. Fixed contact 722 of relay 693 is connected by lead 752 to fixed contact 645 of relay 644.

Contact 711 of relay 694 is connected to one side of the coil 689 of said relay and to terminal T-6 (Fig. 7). Contact 711 is connected by lead 757 to one side of "final compartment load" lamp 758, the other side of which is connected to negative main N. Contact arm 706 of relay 694 is connected by lead 750 to lead 632 which connects the coil of relay 619 to fixed contact 592 of relay 583. Fixed contact 710 of relay 694 is connected by lead 759 to contact arm 707 of relay 695. Contact arm 715 of relay 694 is connected by lead 761 to one side of the coil 689 of relay 692. Contact 716 of relay 694 is connected by lead 763 to fixed contact 591 of relay 580. Fixed contact 711 of relay 695 is connected to one side of the coil 689 of said relay and fixed contact 710 of relay 695 is connected by lead 764 to fixed contact 673 of relay 619.

OPERATION

In order to illustrate the operation of the equipment, it will be assumed that the planning of the loading of an aircraft type DC-4 is to be accomplished and such aircraft has the following characteristics:

a. Basic weight _____ lbs__ 41,500
b. Basic center of gravity_____ inches__ 388
c. Fuel weight _____ lbs__ 13,500
d. Fuel center of gravity_____ inches__ 396
e. Gross take-off weight _____ lbs__ 74,000
f. Cargo weight to be loaded_____ lbs__ 19,000
g. Desired take-off center of gravity____ inches__ 400
h. Center of gravity limits, fore 381.4 inches and aft 407.6 inches.

In addition, the given characteristics of the compartments of the aircraft are as follows:

Table A

| Compartment | Maximum Capacity | Reference Datum to Centroid in Inches | Maximum Moments in Inch-pounds |
|---|---|---|---|
| B | 1,825 | 228.2 | 416,465 |
| C | 4,800 | 290.5 | 1,394,400 |
| D | 4,800 | 350.5 | 1,682,400 |
| E | 4,800 | 410.3 | 1,969,440 |
| F | 4,800 | 470.3 | 2,257,440 |
| G | 4,800 | 530.5 | 2,546,400 |
| H | 4,800 | 590.5 | 2,834,400 |
| I | 4,800 | 650.7 | 3,123,360 |
| J | 1,830 | 711.2 | 1,301,496 |
| K | 1,920 | 774.0 | 1,486,080 |
| L | 1,560 | 832.0 | 1,297,920 |

The weight resistors in the illustrative embodiment are calibrated so that one ohm corresponds to 100 pounds; the moment resistors are calibrated so that one ohm corresponds to 100,000 inch-pounds and the distance resistances are calibrated so that one ohm corresponds to one inch.

To ready the equipment for the planning operation, aircraft selector switch 416 (Fig. 7) is first set to DC-4 position and ganged switches 461, 462, 494 and 503 (Figs. 6 and 8) will also be set to this position. The basic weight knob 11 (Fig. 1) is turned so that resistors 32, 33 and 34 each will be set to 415 ohms and a weight of 41,500 pounds will be indicated on the associated indicator 17. The basic center of gravity position knob 12 is turned so that the resistor 37 will be set to 388 ohms and a basic center of gravity position of 388 inches will be shown on indicator 18.

Fuel weight knob 13 is turned so that resistors 44, 45 and 46 each will be set to 135 ohms and a weight of 13,500 pounds will be shown on the associated indicator 19. The fuel center of gravity position knob 14 is turned so that resistor 49 will be set to 396 ohms and a fuel center of gravity position of 396 inches will be shown on indicator 20.

As the gross take-off weight of such aircraft is to be 74,000 pounds, with a desired center of gravity position of 400 inches, the cargo weight that can be carried is equal to the take-off weight less the sum of the basic weight and fuel weight or 19,000 pounds. Cargo weight knob 16 is turned so that resistors 57, 58 each will be set to 190 ohms and a weight of 19,000 pounds will be shown on indicator 22, and the shaft 23 controlled by knob 16 will also set the pointer 24 of cargo weight accumulator dial 25 to indicate a weight of 19,000 pounds on such dial. The take-off center of gravity position knob 15 is turned so that resistor 53 will be set to 400 ohms and a take-off center of gravity position of 400 inches will be shown on indicator 21.

As all operational predetermined conditions have now been set into the planner, these conditions can be checked by setting the master control switch S-3 (Fig. 10) to the "check" position. In this position conducting member 515 is also engaged by positive arm 514 and the relays 76, 94, 115 and 214 of bridges B-1, B-2, B-3 and B-6 respectively, will be energized so that said bridges are readied for operation.

As the basic weight resistor 34 has been set to a value of 415 ohms proportional to the basic weight of 41,500 pounds; as the basic center of gravity resistor 37 has been set to a value of 388 ohms corresponding to the basic center of gravity of 388 inches, and as the fixed resistor 83 has a value of 1,000 ohms, by the formula:

$$\frac{\text{basic weight (resistor 34)}}{\text{K (resistor 83)}} = \frac{\text{basic moment (resistor 88)}}{\text{basic C. G. (resistor 37)}}$$

when bridge B-2 reaches balance, the servo-motor 91 will have set resistor 88 to a value of 161.02 ohms which is proportional to the basic moment of 16,102,000 inch-pounds. At the same time the resistors 98 and 99 will also be set by the servo-motor to 161.02 ohms. Similarly, the fuel moment resistor 108 will be set by the servo-motor 112 of bridge B-3 to a value of 53.46 ohms which is proportional to a fuel moment of 5,346,000 inch-pounds and resistors 119 and 121 will also be set to 53.46 ohms.

As the resistor 32 which has been set to a value of 415 ohms proportional to the basic weight of 41,500 pounds is connected in series with fuel weight resistor 44, which has been set to a value of 135 ohms proportional to a fuel weight of 13,500 pounds and with the cargo weight resistor 57 which has been set to a value of 190 ohms, proportional to a cargo weight of 19,000 pounds for a total gross take-off weight of 74,000 pounds; as the desired final center of gravity position resistor 53 has been set to a value of 400 ohms related to a center of gravity position of 400 inches; and as fixed resistor 65 has a value of 1,000 ohms, by the formula:

$$\frac{\text{gross weight (resistors 32, 44, 57)}}{\text{K (resistor 65)}} = \frac{\text{gross moment (resistor 71)}}{\text{final C.G. (resistor 53)}}$$

when bridge B-1 reaches balance, the servo-motor 73 will have set resistor 71 to a value of 296 ohms which is proportional to the predetermined gross moment of 29,600,000 inch-pounds. The resistor 79 will also be set by servo-motor 73 to a value of 296 ohms.

As the resistor 33 (Fig. 1) which has a value of 415 ohms corresponding to the basic weight of the aircraft of 41,500 pounds is connected in series with fuel weight resistor 45, which has a value of 135 ohms, corresponding to a fuel weight of 13,500 pounds; with resistors 146 associated with compartments B through N respectively, which initially have substantially zero value and with predetermined station resistors 158 associated with stations X and Y, which also have zero value, the combined basic operating weight at such time is equal to the basic weight plus the fuel weight or 55,000 pounds. As resistors 203 and 205 of bridge B-6 (Fig. 1) are identical, each having a value of 1,000 ohms, by the formula:

$$\frac{\text{present weight (resistors 33, 45, 146, 158)}}{\text{K (resistor 203)}} = \frac{\text{true gross weight (resistor 208)}}{\text{K (resistor 205)}}$$

when bridge B-6 reaches balance, the servo-motor will have set resistor 208 to the true weight of the unloaded aircraft, i.e., to 550 ohms which is proportional to the weight of 55,000 pounds. At the same time, the shaft 209 driven by servo-motor 211 will set pointer 218 of true weight dial 219 to such value of 55,000 pounds and the printer 222 operated by shaft 221 may be operated to record such value.

To determine the center of gravity position of the aircraft based upon the conditions above set forth, it is merely necessary to close switch 584 (Fig. 1) to energize relay 171. As a result, the relay 315 of bridge B-8 will be energized and the series connected weight resistors 33, 45 which have a combined value of 550 ohms and resistors 146 and 158 which have zero value will be connected to junction 303 of bridge B-8. As the basic moment resistor 99 which has a value of 161.02 ohms proportional to the basic moment of 16,102,000 inch-pounds is in series with fuel moment resistor 121, which has a value 53.46 ohms proportional to a fuel moment of 5,346,000 inch-pounds, and with the resistors 231 (Fig. 2) associated with the compartments B through N respectively, which have zero value and with the resistors 238 associated with the stations X and Y which also have zero value and as such moment resistors are connected to junction 303 of bridge B-8, the resistor 305 of which has a value of 1,000 ohms, by the formula:

$$\frac{\text{moment (resistors 99, 121, 231, and 238)}}{\text{Weight (resistors 33, 45, 146, 158)}} = \frac{\text{center of gravity (resistor 309)}}{\text{K (resistor 305)}}$$

when bridge B-8 reaches balance servo-motor 312 will have set resistor 309 to a value of 389.9 ohms which is proportional to the present center of gravity of the unloaded aircraft of 389.9 inches.

Thus the initial setting of the equipment can readily be checked by simple arithmetic involving the determination of basic moment as a product of basic weight and basic center of gravity; the determination of fuel moment involving the product of fuel weight and fuel center of gravity, adding such moments and dividing by the sum of the basic weight and fuel weight to get the present center of gravity.

Assume that the cargo is to be distributed through the sequence of compartments B, C, D, G and H, if possible, or through as many of such compartments as can be accomplished to achieve the desired final center of gravity position of 400 inches and that a pre-load cargo weight of 6,000 pounds is to be loaded into the aircraft with its center of gravity position at a station 440 inches from the reference datum, which cargo extends through compartments E and F of the aircraft.

By reason of the setting of aircraft selector switch 416, the coils of relays RL-12 and RL-13 will be energized to actuate said relays. As compartments E, F which are to have the pre-load of 6,000 pounds and compartments I, J, K and L are not to be loaded, the push buttons P (Figs. 6, 7) associated with such compartments are pressed to close the associated switches and to actuate the relays RL-4, RL-5, RL-8, RL-9, RL-10 and RL-11.

The master control switch S-3 (Fig. 10) is now turned to pre-load position; the pre-load position knob X', for example, (Fig. 2) is turned so that resistor 163 will be set to 440 ohms and a pre-load centroid of 440 inches will be indicated on indicator $X_I$ and the pre-load knob X is turned so that resistors 157, 158 and 159 each will be set to 60 ohms and a weight of 6,000 pounds will be shown on the associated indicator $X_I$.

When knob X is turned, it is also pressed to close the associated switches 245 through 248 inclusive. The closing of switch 245 will connect the resistor 163, which has a value of 440 ohms, to junction 281 of moment bridge B-7, (Fig. 4); the closing of switch 246 will connect the resistor 159 which has a value of 60 ohms to junction 282 of bridge B–7; the closing of switch 247 will connect servo-motor 224 to the output of servo-amplifier 284 of said bridge and the closing of switch 248 will connect balancing resistor 236 to junction 281 of the bridge. As the bridge has a fixed resistor 283, which has a value of 1,000 ohms, by the formula:

$$\frac{\text{weight (resistor 159)}}{\text{K (resistor 283)}} = \frac{\text{moment (resistor 236)}}{\text{arm (resistor 163)}}$$

when bridge B–7 reaches balance, servo-motor 224 will have set resistor 236 to a value of 26.4 ohms which is proportional to the moment of 2,640,000 inch-pounds of the pre-load of 6,000 pounds. The resistors 237, 238 will also be set by servo-motor 224 to such value of 26.4 ohms. After the knob X has been set and is released, the switches 245 to 248 will open and the resistors 157, 158 and 159 will remain set at 60 ohms and the resistors 236, 237 and 238 will remain set at 26.4 ohms.

As in the pre-load position of the master control switch S–3, the relay B–6 is energized, due to the introduction of the pre-load weight of 6,000 pounds and the pre-load moment of 2,640,000 inch-pounds, the true weight bridge B–6 will re-balance as above described to add the additional pre-load weight of 6,000 pounds to the combined basic weight and fuel weight of 55,000 pounds, making a total of 61,000 pounds which will be shown on the dial 219 by pointer 218.

The master control switch S–3 (Fig. 10) is then turned to compartment "B" position. In this position, as well as throughout all of the compartment loading positions, true weight bridge B–6 will normally remain energized.

When contact arm 514 of the master control switch S–3 engages contact B, a circuit will be completed from positive main P, lead 521, closed contacts 522 and 524 of relay 523, lead 538 through coil 539 of relay 541, lead 548, closed contact 549, 568 of relay 547, lead 567, closed contacts 560, 557 of relay 546 to negative main N. Consequently, relay 541 will be energized and a circuit will be completed from positive main P, closed contacts 551, 553 of relay 539, lead 554, closed contacts 555 and 558 of relay 546, lead 570 to the positive terminal of the timer motor M.

Consequently, motor M–1 will be energized to rotate its shaft 511 and the cams C–1 through C–15 mounted thereon in a counterclockwise direction.

When the solid portion of cam C–1 engages wiper arm W–1, a holding circuit will be completed from the common main 513 of switch S–3 which is engaged by the positive contact arm 514, lead 512, cam C–1, wiper arm W–1, lead 571 to the coil 561 of relay 546 to energize such relay. In addition, the lamp 572 will be illuminated to indicate that the equipment is in a computing cycle.

When relay 546 is energized, its contacts 544 and 556 will close to complete a circuit through lead 564 to the coil 565 of relay 547 to energize such relay. When contacts 562, 557 of relay 546 close, the relay 539 will be deenergized. When contacts 563, 558 of relay 546 close, a positive potential will be applied to the positive terminal of motor M to retain the latter energized so long as relay 546 is energized.

By reason of the energization of relay 547, its contacts 545 and 566 will close to provide a holding circuit for the coil of said relay. Energization of relay 547 will also open its contacts 549, 568 to de-energize relay 541.

With continued rotation of motor M in a counterclockwise direction, cam C–2 will engage wiper arm W–2 to energize relays 136 and 186 of remaining moment bridge B–4 and remaining weight bridge B–5 (Fig. 1).

When remaining moment bridge B–4 is energized, as resistor 79 which has been set to a value of 296 ohms proportional to gross moment of 29,600,000 inch-pounds; as resistors 98 and 119 have been set to values of 161.02 ohms and 53.46 ohms, proportional to moments of 16,-102,000 inch-pounds and 5,346,000 inch-pounds and are in series with resistor 237 associated with pre-load station X, which has been set to a value of 26.4 ohms proportional to a moment of 2,640,000 inch-pounds, for a total moment of 24,088,000 inch-pounds, when bridge B–4 is in balance resistor 129 will be set to the difference between the present moment and the predetermined gross moment or to 55.12 ohms proportional to a remaining moment of 5,512,000 inch-pounds and the resistors 139 and 139′ will also be set to such value of 55.12 ohms.

Similarly, the cargo weight resistor 58 which has been set to a value of 190 ohms forms one arm of the bridge B–5 and the resistor 157 associated with pre-load station X and which has been set to a value of 60 ohms forms a second arm of said bridge. Thus, when bridge B–5 is balanced, the resistor 173 will be set to a value equal to the difference between the value of resistors 58 and 157 or to 130 ohms which is proportional to remaining weight of 13,000 pounds and the resistors 189, 189′ and 189″ will also be set to such value.

At this time the motor M will have rotated shaft 511 so that cam C–2 no longer engages wiper arm W–2 and relays 138, 186 of bridges B–4 and B–5 will be deenergized, the resistors 139, 139′ and 189, 189′, 189″ of said bridges remaining in the previously set positions related to the remaining moment of 5,512,000 inch-pounds and the remaining weight of 13,000 pounds.

The first step in determining the weight that can be loaded in compartment B is to compare the quotient (SL) of remaining moment divided by remaining weight prior to the loading of compartment B to the quotient (SΣ) of the sum of the moments divided by the sum of the weights of the compartments B, C, D, G and H to be loaded, for in the illustrative embodiment shown, if SL>SΣ no loading is to be effected into compartment B.

The remaining moment and remaining weight values are determined by bridges B–4 and B–5, as above described. The value of the moments of the compartments in the sequence i.e., compartments B, C, D, G and H, in the illustrative embodiment herein, are premanently set in the equipment. Thus, referring to Table A above, it is found that the resistors 466 associated with switches 462 of relays RL–1, RL–2, RL–3, RL–6 and RL–7 have values of 18.25 ohms, 48 ohms, 48 ohms, 48 ohms and 48 ohms, respectively, proportional to weights of 1,825 pounds, 4800 pounds, 4800 pounds, 4800 pounds and 4800 pounds, respectively, which form a load distribution pattern for such compartments. Similarly, the corresponding moments for compartments B, C, D, G and H are respectively 416,425, 1,394,400, 1,682,400, 2,546,400 and 2,834,400 inch-pounds and the resistors 466 (Figs. 6 and 7) associated with switches 461 of said relays have values of 4.16 ohms, 13.94 ohms, 16.82 ohms, 25.46 ohms and 28.34 ohms respectively, proportional to such moments.

As relays RL–4, RL–5, RL–8, RL–9, RL–10, RL–11, RL–12 and RL–13 have been energized as previously described, it is apparent that a circuit will be completed from positive main P through contact arm 458 of switch 461 of relay RL–1, through resistor 466, lead 479, resistor 466 of relay RL–2, associated lead 479, resistor 466 of relay RL–3, leads 479, 456, contacts 449b and 449 of energized relay RL–4, lead 479 contacts 449b and 449 of energized relay RL–5, lead 479 through resistor 466 of relays RL–8, etc. Thus, it is apparent that only the resistors 466 associated with relays RL–1, RL–2, RL–3, RL–6 and RL–7 will be connected in circuit for a total value of 88.74 ohms which is proportional to a moment of 8,874,000 inch-pounds and such combined resistance is connected to terminal T–1. Similarly the maximum weight resistors 466 associated with compartments B, C, D, G and H which have a value of 210.25 ohms proportional to a weight of 2,025 pounds are connected to terminal T–2.

At this time cam C–3, segment $a$ of a cam C–4 and cam C–5 will engage the associated wiper arms W–3, W–4 and W–5.

When cam C-3 engages wiper W-3, the associated relay 574 will be energized. As a result, contacts 586, 591 and contacts 587 and 592 of relay 574 will close. This will complete a circuit from positive cam C-15, wiper arm W-15, lead 625 through the closed contacts 586, 591 and 587, 592 of relay 574 to the coils of relays 608 and 610 (Fig. 10) to energize such relays.

When the segment $a$ of cam C-4 engages wiper arm W-4 a circuit will be completed from positive main P through lead 654, closed contacts 638, 645 of relay 644, lead 752, closed contacts 721, 722 of relay 693 (Fig. 11), lead 738, closed contacts 717, 715 of relay 692, lead 735, closed contacts 717, 715 of relay 691, lead 734 to the coil of relay 646 of discriminator bridge B-14 to ready said bridge for operation.

When cam C-5 engages wiper W-5, the associated relay 575 will be energized. Hence a circuit will be completed from the positive cam C-15, wiper W-15, lead 625, through the closed contacts 586, 591 of relay 575, lead 626 to the coil of relay 614 to energize said relay. In addition, when the contacts 587, 592 of relay 575 are closed, a circuit will be completed from the positive cam C-15, lead 625, closed contacts 587, 592 of relay 575, lead 637 to terminal T-10 which is connected to fixed contact 639 of discriminator switch 640 to place positive potential on said fixed contact 639.

To make the comparison between the quotient (SL) of remaining moment divided by remaining weight to the quotient (SΣ) of the sum of the remaining given moments divided by sum of the remaining given weights of the compartments in the selected distribution pattern, the following circuit connections are provided.

Resistor 139 of remaining moment bridge B-4 which has a value of 55.12 ohms is connected through closed contacts 672, 671 of relay 609 (Fig. 10) to junction 648 of discriminator bridge B-14. Remaining weight resistor 189 which has a value of 130 ohms is connected through contacts 671, 672 of relay 611, lead 686, contacts 672, 671 of relay 620 to junction 648 of bridge B-14. Terminal T1 (sum of moments ΣM) is connected through contacts 672, 671 of relay 622, lead 687, contacts 672, 671 of relay 612, lead 677 to contact 673 of energized relay 608 which at this time is engaged by the contact arm 671 connected to junction 649 of bridge B-14. Terminal T2 (sum of weights ΣW) (Fig. 7) is connected through closed contacts 671, 672 of relay 623 (Fig. 12) lead 678, to fixed contact 673 of relay 610 which is engaged by its contact arm 671 connected by lead 679 through contacts 671, 672 of relay 613 to junction 649 of bridge B-14.

By the formula $$\frac{\Sigma M}{\Sigma W} = \frac{\text{remaining moment}}{\text{remaining weight}}$$

where ΣM=88.74 ohms proportional to the selected given moment of 8,874,000 inch-pounds of compartments B, C, D, G and H, ΣW=210.25 ohms proportional to the corresponding weight of 21,025 pounds, remaining moment =55.12 ohms proportional to a moment of 5,512,000 inch-pounds and remaining weight =130 ohms proportional to a weight of 13,000 pounds, bridge B-14 will be unbalanced as the quotient $$\frac{\Sigma M}{\Sigma W} \text{ or } S\Sigma = 422.07$$

is less than the quotient of $$\frac{\text{remaining moment}}{\text{remaining weight}} \text{ or } SL = 424$$

so that the servo-motor 643 of bridge B-14 (Fig. 1) will be energized to rotate the arm 642 in a clockwise direction to cause the contacts 639 and 641 of discriminator switch 640 to close momentarily.

The momentary closing of the contacts 639, 641 of the discriminator switch 640 will connect the positively polarized fixed contact 639 to lead 696 (Fig. 12) and thence through the closed contacts 671, 673 of energized relay 614 to the coil of "switch to next compartment" relay 691 to energize such relay. In addition, the fixed contact 711 of relay 691 will be connected to positive main P and the lamp 725 will be illuminated indicating that there must be a shift to the next compartment and no load should be placed into compartment B.

When relay 691 is energized, the closing of its contacts 705, 711 will complete a circuit from the positive cam C-15 (Fig. 12) through wiper arm W-15, lead 726, through closed contacts 705, 711 of relay 691 to the coil 689 to provide a holding circuit for such coil. The closing of contacts 706, 712 of relay 691 will provide a circuit from the positive line 726 through closed contacts 706, 712, lead 727 to the coil of relay 618 (Fig. 11) to energize such relay. The opening of contacts 715, 717 of relay 691, when the latter is energized, will break the circuit from segment $a$ of the positive cam C-4, to the coil of relay 646 of the discriminator bridge B-14 to de-energize said relay, thereby de-energizing the bridge to stop rotation of the servomotor 643.

When relay 618 is energized, the contacts 671, 673 thereof will close to connect fixed resistor 698 to one end of balancing resistor 61 of load director bridge B-15. The closing of contacts 674, 676 of relay 618 will connect fixed resistor 699 to junction 658 of load director bridge B-15.

As a result of the energization of relay 691, further rotation by shaft 511 of cams C-6 through C-12 will have no effect. When cam C-13 engages wiper arm W-13, relay 583 will be energized. When contacts 586, 591 of relay 583 are closed, the positive lead 625 is connected to relay 655 of the load director bridge B-15 to ready the latter for operation.

The resistors 698 and 699, as well as the resistors 661, 656 and 657 of bridge B-15, are of such value that the bridge B-15 will balance in a position such that pointer 668 will indicate zero on the load director dial 669.

When the contacts 587, 592 of relay 583 are closed, the relay 619 will be energized. However, as the contact 673 of relay 619 is connected to the contact 710 of relay 691 which is now spaced from contact arm 707, this will have no effect and the load director will remain at zero position.

With continued rotation of the shaft 511, the cam C-13 will move away from wiper W-13 to de-energize relay 583 and the circuits controlled thereby.

It is to be noted that half-way through the cycle of the motor M, cam C-14 will engage its wiper arm W-14 to energize relay 171 (Fig. 1). As a result, the relay 315 of center of gravity bridge B-8 will be energized and through closed contacts 169′, 253, the present weight resistors 33, 45, 146, 158 which have a value of 610 ohms proportional to a weight of 61,000 pounds, will be connected to junction 303 of the center of gravity bridge B-8. As the moment resistors 99, 121, 231, 238 which have a value of 240.88 ohms proportional to a moment of 24,088,000 inch-pounds are also connected to junction 303 of bridge B-8, by the formula:

$$\frac{\text{moment}}{\text{weight}} = \frac{\text{center of gravity}}{x}$$

where $x$=1,000 ohms, when bridge B-8 is in balance, resistor 309 will be set to a value of 394.89 ohms proportional to a center of gravity position of 394.89 inches which will be indicated on dial 319.

At this time wiper W-1 will be aligned with the notch in cam C-1 to cut off the positive potential to lamp 572 which will then go out to indicate that the equipment is no longer computing and the relay 546 will also be de-energized. As a result of the de-energization of this relay 546, positive potential to the positive terminal of the motor M will be cut off and the motor M will no longer rotate. However, it is to be noted that the wiper W-15 is still engaging the positive cam C–15 so that the "shift to next compartment" relay 691 will remain energized.

With the "shift to next compartment" lamp 725 illuminated, there is an indication to the operator that he should not load the remaining cargo weight into the selected combination of compartments B, C, D, G and H, but should start such loading in a subsequent compartment, for example, compartment C. To accomplish this, the operator turns the master control switch S–3 to compartment C position. As a result, switches S–1 and S–2 will also rotate. As the segment 442 of switch S–1 is one compartment behind as previously described, it will now engage the contact B and the contact arm 487 of switch S–2 will engage the contact C.

The equipment will now determine whether or not the remaining cargo weight can be distributed in the compartments C, D, G and H, which form another distribution pattern, to obtain the desired center of gravity position. To this end the equipment will first determine if the ratio (SL) of remaining moment to remaining weight, which equals 424, is greater or less than the ratio (SΣ) of the sum of the given moments of the compartments C, D, G, and H to the sum of the given weights of said compartments which equal 440.5.

As previously described, the motor M will be energized to rotate the shaft 511 and the cams thereon. Initial rotation of the shaft will cause the notch in cam C–15 to move into alignment with wiper W–15 to break the holding circuit to relay 691 to de-energize such relay so that the "shift to next compartment" lamp 725 will go out and the circuits controlled by said relay will be restored.

As previously described, cam C–1 will provide a holding circuit for the motor M. The cam C–2 will energize the remaining moment and remaining weight bridge B–4, B–5, respectively. As such bridges have already been balanced to give the remaining moment and remaining weight and as no additional weight has been loaded, the bridges will remain in such balanced position with their resistors 139 and 189 set to a value proportional to the remaining moment of 55.12 ohms and the remaining weight of 130 ohms.

Cam C–3 will energize relays 608 and 610 to connect terminals T–1 (ΣM) and T–2 (ΣW) to discriminator bridge B–14, the remaining moment and remaining weight resistors 139 and 189 already being connected to said bridge.

As the positive segment 442 of switch S–1 is engaging contact B, a circuit will be completed to the coil 444 of relay RL–1 to energize said relay. In addition, relays RL–4, RL–5, RL–8, RL–9, RL–10 and RL–11 have been energized by the pressing of the associated pushbutton as previously described and relays RL–12 and RL–13 will have been energized by reason of the setting of the aircraft selector switch to DC–4 position. As a result of the closing of contacts 449, 449b and 453 and 453b of said relay RL–1 the given moment resistor 466 and given weight resistor 466 associated with compartment B will be short-circuited so that the sum of the given moments that remain to be loaded will be the sum of the given moments of compartments C, D, G and H, the new selected load distribution pattern and the sum of the given weights to be loaded will be the sum of the given weights of such compartments C, D, G and H and resistors proportional to such values will be connected in series as shown in Fig. 2 to be connected from terminals T–1 and T–2 to the appropriate junctions of the discriminator bridge B–14.

When segment a of cam C–4 engages its wiper arm W–4, discriminator bridge B–14 will be energized.

By the formula:

$$\frac{\text{remaining moment}}{\text{remaining weight}} = \frac{\text{sum of the moments (compartments C, D, G and H)}}{\text{sum of the weights (compartments C, D, G and H)}}$$

where remaining moment equal 55.12 ohms proportional to a moment of 5,512,000 inch-pounds, remaining weight equal 130 ohms proportional to a weight of 13,000 pounds, the sum of the moments equal 84.576 ohms proportional to a moment of 8,457,600 inch-pounds, sum of the weights equals 192 ohms proportional to a weight of 19,200 inch-pounds, as $$S\Sigma\left(\frac{\text{sum of moments}}{\text{sum of weights}}\right)$$

or 440.5 is greater than $$SL\left(\frac{\text{remaining moment}}{\text{remaining weight}}\right)$$

or 424, bridge B–14 will be unbalanced, but this time in the opposite direction so that the arm 642 will now rotate in a counterclockwise direction and hence have no effect on the discriminator switch 640 which will remain open.

Having thus determined that SL<SΣ which satisfies one of the desired conditions for loading, the equipment then determines if SL is greater than the quotient (SΣ−1c) of the sum of the moments of the compartments C, D and G divided by the sum of the weights of such compartment.

As the discriminator switch 640 is open, the energization of relay 575 by cam C–5 will have no effect and the "switch to next compartment" relay 691 will remain de-energized.

When cam C–6 causes relay 576 to be energized, the relay 653 of bridge B–14 will be energized to reverse the phase of the servo-motor so that it will rotate in an opposite direction, i.e., in a clockwise direction if the ratio (SL) of remaining moment to remaining weight is less than the ratio S(Σ−1c) of the sum of the moments Σ(M−1c) to the sum of the weights Σ(W−1c) in compartments C, D and G. In addition, discriminator bridge B–14 will be energized and positive potential will be applied to terminal T–5. As the resistors FC–C, FC–D, FC–G and FC–H are connected in series between terminals T–5 and T–6 and as said resistors are of such value that if more than one is in circuit insufficient current will flow to relay 694 (Fig. 12) to energize said relay, relay 644 will not be energized.

At this time the remaining moment and remaining weight resistors 139 and 189 will respectively be connected to the discriminator bridge through the normally de-energized relays 609 and 620 (the latter by way of open relay 611) and terminals T–3 Σ(M−1c) and T–4 Σ(W−1c) will be connected to the discriminator bridge B–14 respectively through the normally de-energized relays 608 and 613 (the latter by way of open relay 610).

As relay RL–1 has been energized, the given moment resistors and the given weight resistors associated with compartments C, D and G will be connected in series, each to their associated terminal T–3 and T–4 respectively.

As the quotient of remaining moment divided by remaining weight still equals 424 and as the sum of the moments for compartments C, D and G is 5,623,200 inch-pounds and the sum of the weights for compartments C, D and G is 14,400 pounds, the quotient S(Σ−1c) for such compartments is equal to 390.5. Consequently, the discriminator bridge will be unbalanced, but due to the reversal of the phase of the motor by the energization of relay 653, the motor 643 will rotate in a counterclockwise direction even though SL is greater than S(Σ−1c). Such rotation of the motor will have no effect on the discriminator switch 640 and the latter will remain open.

Consequently, when cam C–7 engages its associated wiper W–7 to energize relay 577, this will have no effect for there will be an open circuit to the "Take Out Last Compartment" relay 692 controlled by relay 615 which in turn is controlled by relay 577.

At this time the equipment has compared the ratio (SL) (of remaining moment to remaining weight) with the ratio SΣ of the sum of the moments to the sum of the weights of compartments C, D, G and H, which provide the selected load distribution pattern and also with the ratio $S(\Sigma-1c)$ of the sum of the moments to the sum of the weights of compartments C, D and G and has determined that the ratio of the remaining moment and remaining weight falls between the values of $S\Sigma$ and $S(\Sigma-1c)$ which is the desired position in the illustrative embodiment herein.

The equipment then determines whether such remaining weight of 13,000 pounds is greater or less than the maximum weight carrying capacity of such compartments C, D, G and H. Thus, when cam C–8 engages wiper arm W–8 to energize relay 578, fixed resistors 665 and 666 are connected in two arms of discriminator bridge B–14, the remaining weight resistor 189 is connected in the third arm of the bridge and the terminal T–2, sum of the remaining weights, i.e., the weights in compartments C, D, G and H, connected in the fourth arm of the bridge.

In the present case the remaining weight to be loaded is 13,000 pounds which is less than the sum of the weights that can be loaded in the four compartments, i.e., 19,200 pounds. As the result, the servo-motor 643 will rotate the arm 642 in a counterclockwise direction so that the discriminator switch 640 will remain open.

Having thus determined that the remaining weight of 13,000 pounds can be accommodated in compartments C, D, G and H, the exact weight of cargo to be loaded into compartment C is now determined by the equipment by the solution of the formula:

(1) $\quad CL = RW\left(\dfrac{S\phi - SL}{S\phi - SC}\right)$ previously derived where $CL$ = computed load for compartment C $RW$ = remaining weight $S\phi = \dfrac{\text{remaining moment of compartments D, G and H}}{\text{remaining weight of compartments D, G and H}}$ $SL = \dfrac{\text{remaining moment}}{\text{remaining weight}}$ $SC = \dfrac{\text{given moment of compartment C}}{\text{given weight of compartment}}$ The engagement of wiper arm W–9 by cam C–9 at this time will have no effect as the discriminator switch 640 is open and the maximum compartment load relay 693 will not be energized.

When cam C–10 engages wiper W–10 to energize relay 580, the relays 335, 357, 377, 399 and 412 of bridges B–9, B–10, B–11, B–12 and B–13 will be energized. In addition, positive potential will be applied to the contact arm 487 of switch S–2 and thence to relay RL–15 associated with compartment C. Energization of such relay will connect the associated resistor 506 which is of ohmic value proportional to the quotient (SC) of moment divided by weight of such compartment C, or 290.5, to one end of resistor 394 of bridge B–12. In addition, terminals T–1 ($\Sigma M$), T–2 ($\Sigma W$) will be connected to junction 414 of bridge B–13.

Referring to Figs. 1 and 3, as two arms of bridge B–9 will be the remaining moment resistor and remaining weight resistor 139' and 189" which have values of 55.12 ohms proportional to a value of 5,512,000 inch-pounds and 130 ohms proportional to a value of 13,000 pounds respectively, and as the resistor 325 which forms the third arm of bridge B–9 has a value of 1,000 ohms, when bridge B–9 is balanced, resistor 328 will become set to a value of 424 ohms equal to SL. Resistor 399 which will also be set to such value of 424 ohms is connected in series with balancing resistor 342 of bridge B–10.

It is to be noted that due to the energization of relay RL–15 associated with compartment C by cam C–10, the given moment resistor and given weight resistor associated with compartment C will be short circuited by the closing of contacts 489, 489b, 490, 490b, so that the given moment and weight resistors connected in series respectively with terminals T–1 and T–2 will only be those associated with compartments D, G and H and have total values of 70.63 ohms proportional to a moment of 7,063,200 inch-pounds and 144 ohms proportional to a weight of 14,400 pounds.

When bridge B–13 is in balance, as resistor 403 has a value of 1,000 ohms, the resistors 406, 347 and 391 will each be set to a value of 490.5 ohms ($S\phi$). As the resistor 347 is connected to junction 343 of bridge B–10, it is apparent that when bridge B–10 is in balance, resistor 342 will be set to a value equal to the difference between $S\phi - SL$ or $490.5 - 424 = 66.5$ ohms and the resistor 361 which forms one arm of computed load bridge B–11 will also be set to this value.

The resistor 391 which has a value of 490.5 ohms ($S\phi$), forms one arm of bridge B–12. As previously described, resistor 506 (SC) is connected in series with balancing resistor 394 of bridge B–12. Hence, when the bridge B–12 is in balance, the resistor 394 will be set to a value proportional to the difference between $S\phi - SC$ or $490.5 - 290.5 = 200$ and the resistor 368 which forms a second arm of bridge B–11 will also be set to this value.

The third arm of bridge B–11 is the resistor 189' which has a value of 130 ohms proportional to the remaining weight of 13,000 pounds. As the result, when bridge B–11 is in balance, by Formula 1 above, resistor 372 (CL) will be set to a value of 43.22 ohms proportional to a weight of 4,322 pounds which is the weight to be loaded into compartment C.

The equipment now determines if the maximum weight capacity of compartment C can accommodate such weight of 4,322 pounds. This determination must be made for the reason that the weight to be loaded into compartment C has been corrected by an increase over proportional distribution as previously described so that after it is so loaded, the quotient of the then remaining moment divided by the then remaining weight will be equal to the quotient of remaining moment to remaining weight for compartments D, G and H, the remaining compartments in the sequence.

The energization of relay 581 by cam C–11 in turn energizes relay 608, 609, 612 and 620. These relays connect fixed resistors 665 and 666 into two arms of the discriminator bridge B–14, the resistor 381 which is of ohmic value of 43.22 ohms proportional to a weight of 4,322 pounds into a third arm, and the maximum compartment weight resistor 497 associated with terminal T–8 which has an ohmic value of 48 ohms proportional to a weight of 4,800 pounds into the fourth arm of the bridge. As the weight of 4,322 pounds can be accommodated into compartment C the discriminator bridge will be energized so that the servo-motor 643 rotates in a counterclockwise direction to have no effect on the discriminator switch 640. By reason of the fact that the discriminator switch 640 is not affected, the engagement of wiper arm W–12 by cam C–12 will have no effect. Thereupon, the cam C–13 will engage wiper arm W–13 to energize relay 583. As the result, the load director bridge B–15 will be energized and the relay 619 will be energized. Energization of the relay 619 will connect the computed weight resistor 381 which has an ohmic value of 43.22 ohms to junction 658 of bridge B–15. Consequently, when bridge B–15 is in balance the resistor 661 thereof will be set to an ohmic value of 43.22 ohms proportional to a weight of 4,322 pounds and such weight will be indicated on the load director dial 669.

When cam C–1 is rotated so that the notch therein is aligned with the wiper arm W–1, the circuit to the relay 546 will be broken thereby opening the circuit to the motor M so that the timer is ready for the next cycle.

The operator then need merely set the knob C' to the centroid of the compartment and set the compartment weight knob C to a position associated with a weight of 4,322 pounds and the resistors associated therewith will be set accordingly, i.e., the resistors 145, 146 and 147 will each be set to an ohmic value of 43.22 ohms. At the same time as such weight is cranked into compartment C, the knob C is pressed to close the associated switches 245, 246, 247 and 248. This will complete the circuit to the compartment moment bridge B-7. As previously described with respect to the pre-load inserted into compartment X, the resistors 229, 230 and 231 controlled by said bridge will each be set to a value of 12.56 ohms which is approximately proportional to a moment of 1,255,541 inch-pounds.

By reason of the normally closed contacts 169' and 170 of relay 171 the true weight bridge B-6 is in circuit at this time and as the weight of 4,322 pounds is cranked into circuit, bridge B-6 will immediately rebalance to set resistor 208 to a value proportional to such weight added to the basic weight of 41,500 pounds; fuel weight of 13,500 pounds and the pre-load weight of 6,000 pounds so that the total weight of the aircraft as thus loaded will be 65,322 pounds and this will be indicated on the true weight dial 219.

If desired, the center of gravity of the aircraft as thus loaded may also be determined by now closing switch 584. This will energize relay 171 to move its contact arms 169' and 256 into engagement with fixed contacts 253 and 255. As a result, the basic weight resistor 33, fuel weight resistor 45, compartment C weight resistor 146 and pre-load weight position X resistor 158 will be connected in series in one arm of the center of gravity bridge B-8. The basic moment resistor 99, the fuel moment resistor 121, the compartment C moment resistor 227 and the pre-load position X moment resistor 238 will be connected in series in a second arm of bridge B-8. As the weight and moment resistors have a combined value respectively of 653.22 ohms and 253.66 ohms proportional to the weight of 65,322 pounds and the moment of 25,365,941 inch-pounds, when bridge B-8 is in balance the resistor 309 will be set to a value of 388.32 ohms proportional to a center of gravity of 338.32 inches and the dial 319 will indicate this value. Thereupon the switch 584 is released to de-energize relay 171 so that true weight bridge B-6 is again connected into circuit.

The operator then turns the master control switch S-3 to compartment D position to determine the loading of such compartment. The cycle above described will then be repeated. As the remaining moment is now 4,256,459 inch-pounds and the remaining weight is now 8,678 pounds, the resistors 139 and 189 of the remaining moment and remaining weight bridges will be set to 42.56 ohms and 86.78 ohms respectively.

The setting of the remaining weight bridge B-5 will also cause the pointer 192 of cargo weight accumulator 25 to move to such value of 8,678 pounds so that the loadmaster is apprised of the remaining weight that he can load into the aircraft.

The ratio (SL) of the remaining moment of 4,256,459 inch-pounds and remaining weight of 8,678 pounds prior to loading compartment D is 490.5, which is equal to $S\Sigma$ for compartments D, G and H so that proportional distribution of the remaining weight of 8,676 pounds may be effected through compartments D, G and H. Solving Formula 1 above, it is found:

$$CL = RW\left(\frac{S\phi - SL}{S\phi - SC}\right)$$

$$= 8,678\left(\frac{560.5 - 490.5}{560.5 - 350.5}\right) = 2,893 \text{ pounds}$$

Thus, it is apparent that when $SL = S\Sigma$ and Formula 1 is used in the computation, it is equivalent to $$CL = RW\left(\frac{\text{given weight of compartment being loaded}}{\text{sum of given weights of compartment remaining in sequence}}\right)$$

Similarly, for compartment G the remaining weight would be 5,785 pounds and the remaining moment would be 3,242,463 inch-pounds for a SL of 560.5 which is equal to $S\Sigma$ for compartments G and H.

Solving Formula 1, it is found:

$$CL = 5.785\left(\frac{590.5 - 560.59}{590.5 - 530.5}\right) = 2,893 \text{ pounds}$$

For compartment H position the remaining moment will be 1,707,727 inch-pounds and the remaining weight will be 2,893 pounds for a SL of 590.5.

When the master control switch S-3 is at compartment H position the motor M will again cycle the cams C-1 through C-15.

When cam C-6 engages its associated wiper W-6, relay 576 will be energized to complete a circuit from positive line 625 to reversing relay 653 of the discriminator bridge B-14. In addition, the closing of contacts 587 and 592 of relay 576 will complete a circuit from positive line 625 through the closed contacts of relay 644 to the coil of discriminator relay 646 so that the discriminator bridge B-14 will be energized. The closing of contacts 593 and 595 of relay 576 will complete a circuit from positive line 625 to terminal T-5.

As at this time the switch S-1 is in compartment H position the contact H is not engaged by the segment 442 (which extends only to contact G) and all of the relays RL-1 through RL-13, except the relay RL-7 associated with compartment H will be energized as previously described. Consequently, the only resistor FC that will remain in circuit is resistor FC-H and hence current will flow from positive terminal T-5 through resistor FC-H to terminal T-6 which is connected to one end of the coil of relay 694, the final compartment load relay. With only one resistor FC-H in circuit with the coil of such relay, sufficient current will flow so that relay 694 will be energized.

As the result of the closing of contacts 705, 711 of relay 694, a holding circuit will be provided from positive cam C-15 to the coil of relay 694 to retain the latter energized. In addition, a circuit will be completed through "final compartment load" lamp 758 which will go on to indicate that compartment H is the final compartment to be loaded. The closing of contacts 706, 712 of relay 694 will complete a circuit from fixed contact 592 of relay 583 through closed contacts 706, 712 of relay 694, lead 748, through closed contacts 710, 707 of relay 693, lead 747 to one side of the coil of relay 611. However, as contact 592 of relay 583 is not engaged by its associated contact arm 587, such circuit will have no effect at this time. The opening of contacts 707, 710 of relay 694 will break the circuit to fixed contact 673 of relay 619. The opening of contacts 714, 716 of relay 694 will break the circuit to fixed contact 591 of relay 580. The opening of contacts 715, 717 of relay 694 will break the circuit to the coil of relay 692 and the closing of contacts 721, 723 of relay 694 will connect positive potential to contact arm 601 of relay 581.

The engagement of cam C-7 with wiper arm W-7 will have no effect as the discriminator switch 640 will remain open inasmuch as the arm 642 is rotating in a counterclockwise direction as the remaining weight of 2,893 pounds is less than the maximum weight than can be loaded into compartment H.

When cam C-8 energizes the associated relay 578, the remaining weight of 2,893 pounds will be compared with the sum of the weights in the remaining compartments, i.e., with the maximum weight that can be loaded into the last compartment of the sequence (compartment H). As the remaining weight is 2,893 pounds and the maximum weight that can be loaded into compartment H is 4,800 pounds, the discriminator bridge will be energized in manner to rotate the arms 642 in a counterclockwise direction to have no effect on discriminator switch 640.

When relay 581 is energized by cam C-11, as the contacts 601, 607 will close to energize relay 644 through the closed contacts 721, 723 of relay 694, the circuit to discriminator relay 646 from cam C–4 will be broken so that the energization of relay 581 will have no effect.

When cam C–13 energizes relay 583, the relay 655 of the load director bridge B–15 will be energized as will be the relays 619 and 611 (through closed contacts 706, 712 of energized relay 694). Energization of relay 611 will connect the remaining weight resistor 189 to one arm of the load director bridge B–15. Energization of the relay 619 will have no effect for the relay 694 is energized. Consequently, the bridge B–15 will balance and at such time the resistor 661 will become set to a value of 28.93 ohms proportional to a weight of 2,893 pounds. When the knob associated with compartment H is set to such value, the true weight will equal 74,000 pounds, the total load and the center of gravity position will equal 400 inches, the desired center of gravity.

From the foregoing it is apparent that the following steps were performed:

(1) $\frac{RM}{RW}$ compared to $\frac{\Sigma M}{\Sigma W}$ (compts. B, C, D, G, H)

(2) $\frac{RM}{RW} > \frac{\Sigma M}{\Sigma W}$ hence "switch to next compartment"

(3) $\frac{RM}{RW}$ compared to $\frac{\Sigma M}{\Sigma W}$ (compts. C, D, G, H)

(4) $\frac{RM}{RW} < \frac{\Sigma M}{\Sigma W}$ (5) $\frac{RM}{RW}$ compared to $\frac{\Sigma(M-1c)}{\Sigma(W-1c)}$ (compts. C, D, G)

(6) $\frac{RM}{RW} > \frac{\Sigma(M-1c)}{\Sigma(W-1c)}$ (7) RW is compared to maximum weight capacity of compartments C, D, G, H (8) $RW < \Sigma W$ (C, D, G, H)

(9) Formula $CL = RW\left(\frac{S\phi - SL}{S\phi - SC}\right)$ is solved

(10) CL is compared with maximum weight for compartment C

(11) CL<maximum weight for compartment C

(12) Bridge B–15 energized to indicate CL

(13) Knob C is manually turned to weight CL for compartment C

(14) Master control switch S–3 is turned to compartment D position

(15) $SL = S\Sigma$ (compartments D, G, H)

(16) $CL = RW\left(\frac{\text{maximum weight for D}}{\text{sum of maximum weights D, G, H}}\right)$

(17) Steps 12, 13, 14, 15 and 16 are repeated for compartments D, G and H.

In the planning of the load of the aircraft beginning with compartment C as previously described when cam C–6 energized relay 576, the quotient of $$\frac{RM}{RW}$$

was compared to the quotient of $$\frac{\Sigma(M-1c)}{\Sigma(W-1c)}$$

If it was found that $$\frac{RM}{RW} < \frac{\Sigma(M-1c)}{\Sigma(W-1c)}$$

which would cause the discriminator switch 640 to close, the equipment would function in the following manner.

When cam C–6 energizes relay 576, terminal T–5 is connected to positive main P. As a result, the equipment determines if the compartment to be loaded is the last compartment in the sequence. As the compartment C is not the last compartment, resistors FC–C, FC–D, FC–G and FC–H are in circuit and insufficient current will flow to energize final compartment load relay 694.

Cam C–7 will energize relay 577 which in turn energizes relay 615. As the discriminator switch is closed at this time, positive potential will be applied to "take out last compartment" relay 692 to energize the latter.

As a result, the lamp 741 will be illuminated; a holding circuit will be provided for said relay; the circuit to bridges B–9, B–10, B–11, B–12, B–13 and B–14 will be broken and relay 618 will be energized to connect fixed resistors 698, 699 to the load director bridge B–15 which will balance to zero indication.

When:

$$\frac{RM}{RW} < \frac{\Sigma(M-1c)}{\Sigma(W-1c)}$$

in the illustrative embodiment herein, the most aft compartment in the sequence, i.e., compartment H must be removed from the computation; this is accomplished by pressing pushbutton PH after computing lamp 572 has gone out.

The equipment is then recycled by closing switch 535 (Fig. 10) to determine if the desired final center of gravity can be obtained by loading into compartments C, D and G. This is necessary to again cycle timer for the same compartment C.

When switch 535 is closed, motor M' will be energized to rotate shaft 528 and cams C–16, C–17 and C–18. Cam C–18 will provide a holding circuit for the motor for one revolution of the cam. Cam C–17 will energize gross moment bridge B–1, but its motor 73 will not rotate as the conditions effecting this bridge have not changed. Cam C–16 will energize relay 523 which will de-energize relay 547. Thus, when cam C–16 moves away from its wiper W–16 and relay 523 is again energized, the motor M will be energized as previously described so that the equipment will again compute for compartment C, but with compartment H removed from the calculations.

If the compartment to be loaded should be the last compartment in the sequence, for example, compartment H, and the remaining weight to be loaded is greater than the maximum weight capacity of such last compartment, the discriminator bridge will rotate in direction to close switch 640. As a result, when cam C–8 energizes relay 578 and in turn relay 616, the maximum compartment loads relay 693 will be energized.

As a result, maximum compartment load lamp 744 will be illuminated; positive potential will be applied to terminal T–7 to energize relay RL–20 and to relay 617 to energize said relay; the circuit to load director bridge B–15 from computed load resistor 381 will be opened as will the circuit to the discriminator bridge B–14.

When relay 617 is energized, terminal T–8 will be connected to the load director bridge B–15. As only resistor 497 associated with compartment H is in circuit, which has a maximum weight capacity of 4,800 pounds, the bridge B–15 when balanced will indicate this value on dial 669.

The operator need merely set the knobs H and H' associated with compartment H to the indicated value and the centroid of the compartment respectively and close switch 584 to energize the center of gravity bridge B–8 to indicate the center of gravity position of the aircraft loaded as thus indicated.

If the center of gravity position is outside of the permissible limits, the operator need merely adjust one or more of the knobs associated with the other compartments in the sequence to add any weight that remains of the cargo load and close switch 584 to determine the center of gravity shift. This procedure is also followed if the center of gravity position is within the permissible limits to see if the remaining cargo weight can be safely loaded.

In addition, if the entire cargo load is planned and found to be within safe limits of the center of gravity and cargo is to be off-loaded either by air drops or at a given destination or if cargo is to be loaded into the aircraft at such destination the operator can either set into or remove from the computations the appropriate weight by adjustment of the related knobs B to N, X or Y associated with the compartment or pre-load stations from which weight is to be added or removed. Thereafter the switch 584 (Fig. 1) can be pressed so that center of gravity bridge B-8 can compute the center of gravity position of the aircraft as thus off or on loaded.

In the event that prior to the loading of the last compartment, the remaining weight exceeded the sum of the maximum weights for the remaining compartments in the sequence, when cam C-12 energized relay 582 and thence relay 621, as the discriminator switch 640 would close, relay 695 would be energized.

Hence, the maximum compartment weight resistor 497 associated with the compartment to be loaded would be connected through energized relay 617 to the load director bridge which would balance to the value of such resistor and the corresponding weight would be indicated on dial 669.

After such weight was set into circuit by the adjustment of the associated compartment knob, the load planning would continue in the manner indicated.

In the illustrative embodiment shown, the load planning is based upon a distribution pattern in which the given weights and corresponding moments for the respective compartments are fixed. Thus, for any selected sequence of compartments, there is a specific proportional distribution pattern which determines the distribution of the cargo load into the compartments of the sequence.

Where it is desired to change the distribution pattern based, for example, upon the weight of cargo, the compartment moment and weight resistors 466, 467, the weight resistors 497, 498 as well as the (SC) resistors 506, 507 shown in Figs. 6–9, can be made variable if desired so that any desired distribution pattern may be set into the equipment.

Thus, in certain types of aircraft with heavy cargo loads, it may be desired to have substantially the same weight of cargo in each of the compartments of the aircraft. Accordingly, the weight resistors 466, 467; 497, 498 would each be set to have the same value and the moment resistors 466, 467 and SC resistors 506, 507 set accordingly. Where, in such aircraft the cargo load is relatively light, it may be desired to have most of the weight in the intermediate compartments and little weight in the fore and aft compartments. Accordingly, the weight resistor associated with such fore and aft compartments and the corresponding moment resistor would be set to have relatively low value as compared to the resistors associated with the intermediate compartments.

In the illustrative embodiment shown, proportional distribution of the cargo load is only effected when $SL=S\Sigma$, in which case the desired center of gravity position is attained.

As previously pointed out, if SL is greater or less than $S\Sigma$, then the weight planned for the compartment would have to be less or greater respectively than the proportional distribution in order to obtain the desired final center of gravity position.

If SL only slightly deviates from $S\Sigma$, by using the proportional distribution, the final center of gravity position will only slightly differ from the desired center of gravity position which in most instances is satisfactory.

To accomplish such proportional distribution even when SL is not equal to $S\Sigma$, the conventional sensitivity control of the servo-amplifier 647 of the discriminator bridge B-14 is adjusted so that the motor of said bridge will stop rotating when SL is greater or less than $S\Sigma$ by an amount dependent upon the setting of the sensitivity control.

In the illustrative embodiment shown, no load planning was effected when $SL>S\Sigma$, as the weight to be planned for loading in such case is less than the proportional distribution.

Where it is desired to leave the determination of whether or not to load weights below those secured by proportional distribution, up to the cargo loading supervisor, the equipment may readily be modified to indicate weights from zero to any desired maximum weight.

Thus, instead of comparing SL to $S\Sigma$, SL is compared to $S\phi$ which is accomplished by providing another set of contacts 600, 600' shown in dot and dash lines in Fig. 11 controlled by relay 574, the former being connected to line 625 and the latter to terminal T-7 to function in the manner previously described with respect to contact 676 of relay 580 which is also connected to terminal T-7.

It can readily be seen from the formula:

$$CL = RW\left(\frac{S\phi - SL}{S\phi - SC}\right)$$

that when $SL=S\phi$, $CL=0$ and as $S\phi$ increases, CL increases.

The equipment above described can readily be modified to dispense with the need for manual setting for successive compartment after the operator has set in the initial values as above set forth and is satisfied with the planned weight to be loaded into the first compartment in the sequence, as shown on the load director dial 669 (Fig. 5). This can be accomplished by slight modifications in the equipment and the use of programming and follow-up systems well known to those skilled in the art.

In the embodiment shown in Figs. 1 to 12, switches S-1, S-2 and S-3 are ganged and switch S-3 can only be rotated manually. In the embodiment shown in Fig. 13, switch S-3 can be rotated by a conventional automatic electrical stepping mechanism, which stepping mechanism may be operated manually, when required.

Thus, as previously described, if the "Switch to Next Compartment" lamp 725 is illuminated, at the same time the stepping mechanism (not shown) for switch S-3 will be energized so that the contact arm 514 (Fig. 10) of said switch will search for and stop at the next open or available forward compartment, which depends upon the setting of the pushbuttons PB–PN and aircraft selector switch 416 (Figs. 6, 7). At the same time switches S-1 and S-2 (Figs. 7 and 9) ganged to switch S-3 will be moved to the corresponding position.

In the embodiment shown in Figs. 1 to 12, when relay 692 (Figs. 11) is energized, lamp 741 will be illuminated to indicate that the last compartment in the sequence should be taken out of the computation. In the embodiment shown in Fig. 13 a conventional electrical stepping switch S-4 has been added which is connected to the relays 421–433 (Figs. 6 and 7) controlled by the pushbuttons PB to PN and which is actuated when relay 692 is energized, to energize that of the group 421–433 which is associated with the last compartment in the selected sequence, so that the compartment associated with such relay will be removed from the computations in the same manner as if the associated pushbutton had been manually actuated.

The equipment shown in Figs. 1 to 12 may also be further modified to add a predetermined gross weight bridge B-16 (Fig. 13) which will give the sum of the basic weight, fuel weight and cargo weight and which is used in the manner hereinafter described. In addition, the cams C-1 to C-18 are replaced by a relay programmer unit P (Fig. 13) which operates the associated relays in the manner hereinafter described and the discriminator switch 640 (Fig. 1) has been modified to have two sets of contacts so that it can discriminate between three functions, i.e., greater, equal, or smaller.

The automatic operation of the equipment will now be briefly described.

After the initial conditions and pre-loads, if any, have been set into the equipment as above described with respect to the embodiment of Figs. 1 to 12, the operator need merely set master control switch S-3 to the first compartment in the sequence and closes the start switch 801 shown in Fig. 13 to set the programmer P into operation.

The relays of the programmer will actuate the associated relays of the relay bank RL-1 to RL-15 (Fig. 11) to compare SL to SΣ (1, Fig. 13) as previously described. Three possibilities occur:

(A) If $SL>S\Sigma$ (1A, Fig. 13) the programmer will energize stepping switch S-3 (Figs. 10 and 13), to search for and stop at the next available forward compartment in the sequence and also will restore the equipment to (1) so that it will again compare SL with SΣ (with the first compartment eliminated).

(B) If $SL=S\Sigma$ (1B) the programmer will complete a circuit through the two contacts of the discriminator switch to the relays which compare RW with ΣW(2).

(i) If $RW>\Sigma W$ (2A) the programmer will stop and a lamp 802 will be illuminated to indicate this fact to the operator who can reduce the cargo load or add more compartments. When this is done the operator releases the programmer by actuating switch 803 and the equipment will return be restored to its original position (1) to compare SL with SΣ.

(ii) $RW=<\Sigma W$ (2AB) the programmer will cause the values of RW and ΣW to be retained (2ABA) and resistance of such values as well as resistance of value related to the maximum compartment weight (MCW) for the particular compartment at which switch S-3 is set, will be connected into the load director bridge B-15 (9).

The load director bridge B-15 will then compute and indicate the load on dial 669 (Fig. 5) for the compartment being planned which is the proportional load for such compartment.

The programmer will then stop as indicated at 804 in Fig. 13 so that the operator may check the load planned for the first compartment in the sequence.

(a) If the operator is not satisfied with the load planned for the first compartment, he may make adjustments in the desired cargo weight, desired take-off center of gravity position, compartment selection or any combination thereof and then release the programmer so that it will return to its original position (1) to again compare SL with SΣ.

(b) If the operator is satisfied with the load plan for the first compartment, he will release the programmer and thereafter the "stop check" position 804 will be bypassed. Upon such release of the programmer, the printer 805 will be actuated to print the weight planned and the associated compartment.

(1) If such compartment is the last compartment of the sequence, the programmer will actuate the printer 805 to print the predetermined gross weight as computed by the gross weight bridge B-16 (Fig. 14) and the desired final center of gravity position as set by resistor 53 (Fig. 1). Thereupon the programmer will automatically switch to "off" position.

(2) If such compartment is not the last compartment of the sequence, the programmer will connect the retained RW and ΣW into the load director bridge B-15 together with a resistance of value related to the maximum compartment weight for such next compartment in the sequence and will energize stepping switch S-3 to the next compartment position. As a result, the proportional loading for such compartment will be indicated and printed by printer 805 and the programmer will return to again compute the load for the next compartment (2ABA).

(C) If $SL<S\Sigma$ (1C), the programmer will then compare SL with $S(\Sigma-1c)$ (3)

(i) If $SL=$ or $>S(\Sigma-1c)$ (3A) then RW is compared with ΣW (3AA).

(a) If $RW>\Sigma W$ (2A) then the programmer will stop and lamp 802 will be illuminated to indicate this fact to the operator who can reduce the cargo load or add more compartments. When this is done the operator releases the programmer by actuating switch 803 and the equipment will again be restored to its original position (1) to compare SL with SΣ.

(b) If $RW=$ or $<\Sigma W$ (3AAB) the programmer will actuate the appropriate relays to compute CL (4) by the formula:

$$CL = RW\left(\frac{S\phi - SL}{S\phi - SC}\right)$$

Thereupon, CL is compared (5) with the maximum capacity (MC) for the compartment for which the load is being planned as previously described with respect to the embodiment shown in Figs. 1 to 12.

(1) If $CL<MC$ (5A) the programmer will operate the relays to connect the maximum compartment capacity (5AA) into the load director bridge (7) and the stop check action 804 of the programmer will take place if this is the first compartment in the sequence being planned.

(X) If it is the first compartment and the operator accepts the load planned, he will release the programmer and the printer 805 will be actuated to print the planned weight and compartment identification. In addition, the resistors 145, 146, 147 (Fig. 2) of the associated compartment will be set to the weight indicated by the load director by suitable servo-mechanism.

If the operator is not satisfied with the load planned for the first compartment, he may make adjustments in the desired cargo weight desired take-off center of gravity position, compartment selection or any combination thereof and then release the programmer so that it will return to its original position (1) to again compare SL with SΣ.

(Y) If the compartment is the last compartment, the programmer will cause the printer to print the true gross weight and center of gravity position and then go to "off" position.

(Z) If such compartment is not the last compartment in the sequence, the programmer will actuate stepping switch S-3 to the next position and then returning to its original position (1) to again compare SL with SΣ.

(2) If $CL=$ or $<MC$ (5B), the programmer will connect the computed load (5BB) into the load director bridge B-15 (6) and thereupon the operation will continue as in (1) above for $CL>MC$ (5A).

(ii) If $SL<S(\Sigma-1c)$ (3B) and there is (a) more than one compartment to be planned (3BB), the programmer will pulse switch S-4 automatically to take out the last compartment in the sequence and return to the original position (1) to compare SL with SΣ.

(b) If there is only one compartment remaining (3BA), the programmer will compare RW to ΣW (3BAAA).

(1) If $RW>\Sigma W$ the action is the same as described above (B)(i) when $SL=S\Sigma$.

(2) If $RW=$ or $<\Sigma W$, the programmer will connect the RW into the load director bridge (8). Again the stop check action 804 will occur and if the load is accepted, the programmer will cause the printer to print the load director weight and compartment identification. In addition, the resistors 145, 146 and 147 (Fig. 2) of the associated compartment will be set to the weight indicated by the load director and the printer will print the true gross weight and center of gravity position and the programmer will go to "off" position.

It is apparent from the foregoing that after setting in the initial values the equipment shown in Fig. 13 is automatic, but it leaves to the operator the choice of determining in what compartment the distribution of load should commence.

The equipment above described can be used as shown in Fig. 14 in conjunction with center of gravity computing equipment 805 of the type shown and described in Patent No. 2,686,426, dated August 17, 1954.

Thus, after the initial values of aircraft type, fuel weight, fuel center of gravity, etc. are set into the combined equipment 805, 806, an aircraft would be set on the weighing scales S of the center of gravity equipment 805.

Conventional servo-mechanism would be provided to transmit the center of gravity position and weight calculations computed by this equipment 805 in the manner described in said patent, to set the basic weight and basic center of gravity resistors shown in Fig. 1.

Thereupon, the aircraft could be removed from the scales S and the planning equipment 806 would function in the manner above set forth.

After the load planning had been accomplished and the aircraft loaded according to such plan, the actual center of gravity position and gross weight could be checked by again placing the aircraft on the weighing scales of the center of gravity equipment 805.

It is to be noted that the combined equipments 805, 806 could be used throughout the loading operation.

Thus, with the aircraft on the scales S, after the portion of cargo weight to be loaded into the first compartment of the sequence has been indicated, the cargo loading supervisor would attempt to load such weight into the compartment. As the loading of such exact weight might not be achieved due to variations in the actual weight of the items of cargo from those marked by the manufacturers, by inspection of the true weight dial 219, the cargo loading supervisor could determine the weight of cargo actually loaded and could then set the knob associated with such compartment to the actual weight loaded.

By following this procedure the equipment would then recompute the distribution of the remaining cargo weight for the desired center of gravity position.

If desired, the cargo loading supervisor need not load the compartments in sequence, thus for example, comparment B could be loaded, then compartment D and then compartment C. This could readily be accomplished by slight modification of the equipment so that the data of the previous compartment, C, for example, would be retained in the computations while the load for D was determined.

As such modification of the equipment would be readily apparent to those skilled in the art, no further description thereof will be given.

The equipment herein described utilizes analog units for multiplying, dividing, subtracting and adding. It is to be understood that it is within the scope of the invention to utilize digital units for this purpose.

As many changes could be made in the above equipment, and many apparently widely different embodiments of this invention could be made without departring from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Equipment for determining the distribution of weight into regions of an aircraft for desired center of gravity position of the loaded aircraft, said equipment comprising an adjustable unit, means to set said unit to a position related to the weight remaining to be loaded into the aircraft, a second adjustable unit, means to set said unit to a position related to the moment of such remaining weight, which is the difference between any desired moment of the aircraft after it is loaded with the entire weight to be carried and the actual moment of the aircraft before loading the remaining weight, a plurality of units predetermined values related to a given weight and corresponding moment for any sequence of regions of the aircraft, means to select a group of such units for a desired sequence of regions to be loaded, means controlled conjointly by the settings of said two adjustable units and the selected groups of said plurality of units for determining the portion of the weight to be loaded into the first region of the sequence, the means to set said adjustable units, resetting the latter to the weight and moment remaining after deduction of the weight previously determined and its corresponding moment, and means to eliminate successive units of the plurality from the computations of the equipment as the portions of weight are determined for the corresponding regions of the sequence, the means controlled conjointly by the settings of the two adjustable units coacting successively with the plurality of units remaining to determine the portions of weight for the remaining regions of the sequence.

2. The combination set forth in claim 1 in which the plurality of units comprises a group of units related to a given weight for each region and a second group of units related to the corresponding moment, and said conjointly controlled means comprises means to compare the quotient of the values of the two adjustable units to the quotient of the sum of the values of the units in the respective groups and means when said first quotient is equal to the second quotient for determining the product of the value of the first adjustable unit and a factor proportional to the quotient of the value of the first unit in said first group divided by the sum of values of all the units in said first group.

3. The combination set forth in claim 2 in which an indicator is provided, said product determining means sets an adjustable product unit to a position related to such product, a bridge circuit is provided having an adjustable unit in one arm, means to connect said adjustable product unit in a second arm, and means controlled by unbalance of said bridge and connected to said adjustable unit and said indicator to set said indicator to a position related to the value of said adjustable product unit.

4. The combination set forth in claim 3 in which means are provided to connect the adjustable product unit and the unit related to the weight in the region to be loaded to said comparing means and means when the value of said adjustable product unit exceeds the value of said unit of value related to the weight in the region to be loaded to connect a unit of value related to the weight in the region to be loaded in the second arm of said bridge in place of said adjustable product unit.

5. The combination set forth in claim 1 in which the plurality of units comprises a group of units related to a given weight for each region and a second group of units related to the corresponding moment, and said conjointly controlled means comprises means to compare the quotient of the values of the two adjustable units to the quotient of the sum of the values of the units in the respective groups and means when the range of deviation of the value of the first quotient from the value of the second quotient is no greater than a predetermined amount for determining the product of the value of the first adjustable unit and a factor proportional to the quotient of the value of the first unit in said first group divided by the sum of values of all the units in said first group.

6. The combination set forth in claim 1 in which the plurality of units comprises a group of units related to a given weight for each region, a second group of units related to the corresponding moment and a third group of units related to the ratio of the given moment to the given weight for each region, and said conjointly controlled means comprises means to compare the quotient of the values of the one of the adjustable units to the other adjustable unit to the quotient of the sum of the values of the units in one of the said first two groups to the sum of the values of the units in the other of said first two groups, and means when said first quotient is no greater than said second quotient for determining the product of the value of the first adjustable unit by a factor related to the number of regions in the sequence, said means comprising means for determining the ratio of the sum of the values of the second group of units less the first unit to the sum of the values of the first group of units less the first unit, further means for determining the ratio of the value of the second adjustable unit to the value of the first adjustable unit, a pair of adjustable units, set respectively to the value of said last two ratios, means for determining the difference between the values of adjustable units of such pair, an additional adjustable unit set to the value of the first of said last two ratios, means to determine the difference between the values of the additional adjustable unit and the unit of said third group related to the first region, a second pair of adjustable units respectively set to such two differences, means to determine the product of the value of the first adjustable unit multiplied by the quotient of the value of the first adjustable unit of such second pair divided by the value of the second adjustable unit of such second pair, an indicator and means controlled by said product determining means to set said indicator to a position related to such product.

7. The combination set forth in claim 6 in which said product determining means sets an adjustable product unit to a position related to such product, a bridge circuit is provided having an adjustable balancing unit in one arm, means to connect said adjustable product unit in a second arm, means controlled by unbalance of said bridge and connected to said adjustable balancing unit and said indicator to set said indicator to a position related to the value of said adjustable product unit, means to connect the adjustable product unit and the unit related to the weight in the first region to said comparing means, and means when the value of said adjustable product unit exceeds the value of the weight unit, to connect a unit of value related to such weight unit in the second arm of the bridge in place of said adjustable product unit.

8. Equipment for determining the distribution of a cargo weight into an aircraft for desired center of gravity position of the loaded aircraft, said equipment comprising an adjustable unit, means to set said unit to a position related to the remaining cargo weight to be loaded into the aircraft, a second adjustable unit, means to set said unit to a position related to the moment of such remaining cargo weight, a plurality of units of predetermined values related to a given weight and corresponding moment for each of a sequence of regions of the aircraft, a means to provide multiplicity of circuits related to a plurality of various possible groups of regions of such sequence among which the cargo load might be distributed, said circuits including units of said plurality, means controlled by the settings of said two adjustable units for determining the selection of one of said multiplicity of circuits, a load director having an indicator and means controlled conjointly by the first adjustable unit and the units of said plurality included in the selected circuit for establishing a setting of said indicator which corresponds to said remaining cargo weight multiplied by a factor related to the number of regions in the selected group of regions.

9. The combination set forth in claim 8 in which the value of each of the units of said plurality is adjustable.

10. The combination set forth in claim 8 in which said plurality of units includes a group of units related to given weights for the respective regions of such sequence, a second group of units each related to given moments corresponding to the respective given weights, and means for determining the ratio of a given moment to the corresponding given weight for each of such regions, and the means for establishing a setting of said indicator comprises circuits for determining the product $$RW \times \frac{S\phi - SL}{S\phi - SC}$$

where $RW$ = value of first adjustable unit $S\phi = \dfrac{\text{sum of values of second group of units less the first unit of the group}}{\text{sum of values of first group of units less the first unit of the group}}$ $SL = \dfrac{\text{value of second adjustable unit}}{\text{value of first adjustable unit}}$ $SC$ = value of the ratio of given moment to given weight for the first region 11. The combination set forth in claim 10 in which the means for determining the ratio of given moment to given weight comprises a third group of units related respectively to such ratio for each of such regions.

12. The combination set forth in claim 8 in which said plurality of units includes a group of units related to given weights for the respective regions of such sequence, a second group of units each related to given moments corresponding to the respective given weights, a third group of units each related to the ratio of given moment to given weight for the respective regions, switch means control said multiplicity of circuits to connect in series respectively, any desired group of the units in the first and second groups, less the units of said two groups associated with the first region of the sequence, and the means controlled conjointly for setting said indicator comprises means controlled by the connected group of units to determine the ratio of the values of the series connected moment units to the series connected weight units, a first and second additional unit set by said means to the value of such ratio, means controlled by the second and first adjustable units to determine the ratio of remaining moment to remaining weight, a third additional unit set by said means to the value of such ratio, means to determine the difference between the values of the first and third additional units, a fourth additional unit set to such difference, means to determine the difference between the second additional unit and the unit of the third group related to the first region of the sequence, a fifth additional unit set to such difference, means to determine the product of the value of the first adjustable unit multiplied by the quotient of the value of the fourth additional unit divided by the value of the fifth additional unit, a sixth additional unit set by said means to such product and means controlled by the setting of said sixth additional unit to set said indicator.

13. The combination set forth in claim 8 in which a plurality of adjustable means are provided adapted to be set respectively to positions related to the weight of the aircraft without cargo, the center of gravity of such aircraft without cargo, the weight of cargo to be carried and the desired center of gravity position of the loaded aircraft, a second plurality of adjustable means are arranged to be set to the weight to be loaded into the respective regions of the aircraft, means associated with each of said second plurality of means to be set to a position corresponding to a predetermined position in each of the respective regions, means to determine the product of the values of the adjustable means related to the weight and center of gravity of the aircraft without cargo, which is the moment of such aircraft without cargo, means to determine the products of the second plurality of adjustable means related to the weight and position for each of said regions, which is the moment of each of such weights, means to determine the sum of all of such products, means to determine the product of the value of the adjustable means related to the desired center of gravity position and the sum of the values of the adjustable means related to the weight of the aircraft and the cargo weight, means to determine the difference between said last product and the sum of such products, which is the moment of the remaining cargo weight to be loaded, means to determine the sum of the adjustable means related to the weight to be loaded into each compartment, and means to determine the difference between the adjustable means related to the cargo weight to be carried and such sum, which is the remaining weight to be loaded.

14. The combination set forth in claim 13 in which means are provided to determine the sum of the values of the adjustable means related to the weight of the aircraft without cargo and the second plurality of adjustable means set to the weight planned for loading into the respective regions, means to determine the center of gravity position of the aircraft, said means comprising a bridge circuit having in one arm units of value related to the sum of such products or the moment of the aircraft as planned for loading, having in a second arm units of value related to the sum of such weights and having an adjustable unit in a third arm and means controlled by unbalance of said bridge to set the adjustable unit in the third arm to a position proportional to the quotient of the values of the units in the first arm divided by the value of the units in the second arm.

15. The combination set forth in claim 13 in which means are provided to determine the weight of the aircraft as planned for loading, said means comprising a bridge circuit having in one arm an adjustable unit and in a second arm the adjustable means related to the weight to be loaded into each of such regions and the adjustable means related to the weight of the aircraft without cargo and means controlled by unbalance of said bridge to set said adjustable unit to a position related to the value of the sum of the adjustable means in said second arm or to the weight of the aircraft as planned for loading.

16. The combination set forth in claim 8 in which a plurality of adjustable means are provided adapted to be set respectively to positions related to the weight of the aircraft without cargo, the center of gravity position of such aircraft without cargo, the weight of cargo to be carried and the desired center of gravity position of the loaded aircraft, a second plurality of adjustable means are arranged to be set to the weight to be loaded into the respective regions of the aircraft, means associated with each of said second plurality of means to be set to a position corresponding to a predetermined position in each of the respective regions, means to determine the product of the values of the adjustable means related to the weight and center of gravity of the aircraft without cargo, which is the moment of such aircraft without cargo, means to determine the products of the second plurality of adjustable means related to the weight and position for each of said regions, which is the moment of each of such weights, means to determine the sum of such products, means to determine the product of the value of the adjustable means related to the desired center of gravity position and the sum of the values of the adjustable means related to the weight of the aircraft and the cargo weight and means to determine the difference between said last product and the sum of such products, which is the moment of the remaining cargo weight to be loaded.

17. The combination set forth in claim 16 in which means are provided under control of the means for establishing the setting of said indicator successively to set said second plurality of adjustable means to the weight to be loaded into the respective regions.

18. The combination set forth in claim 16 in which means are provided to determine the weight and compute the center of gravity of an aircraft and the adjustable means adapted to be set to positions related to the weight of the aircraft without cargo and the center of gravity position of such aircraft without cargo are automatically controlled by such means.

19. The combination set forth in claim 16 in which means are provided to determine the sum of the adjustable means related to the weight to be loaded into each compartment, and means are provided to determine the difference between the adjustable means related to the cargo weight to be carried and such sum, which is the remaining weight to be loaded.

20. Equipment for determining the distribution of a given cargo weight into a sequence of regions of an aircraft for desired center of gravity position of the loaded aircraft, said equipment comprising an adjustable unit, means to set said unit to a position related to the remaining cargo weight to be loaded into the aircraft, a second adjustable unit, means to set said unit to a position related to the moment of such remaining cargo weight, a plurality of units of predetermined value related to a given weight and corresponding moment for any sequence of regions of the aircraft means to select a group of such units for a desired sequence of regions to be loaded, an indicator and means controlled by the settings of said two adjustable units and the selected groups of said plurality of units successively to set said indicator to positions related to the values of the weights to be loaded into successive regions of the aircraft, each of such values being such that the ratio of the difference between the then remaining moment determined by the setting of the second adjustable unit and the moment of such weight value for the associated region to the difference between the then remaining weight determined by the setting of the first adjustable unit and such weight value, is equal to the ratio of the sum of the given moments of all of the regions remaining of the sequence less the region associated with such weight value determined by the settings of the associated units of said plurality, to the sum of the given weights of all such regions less the region associated with such weight value determined by the settings of the associated units of said plurality.

21. Equipment for determining the distribution of a cargo weight into a sequence of regions of an aircraft for desired center of gravity position of the loaded aircraft, said equipment comprising an adjustable unit, means for setting said unit to a value related to the remaining weight of cargo to be loaded into the aircraft, a second adjustable unit, means to set said second unit to a value related to the remaining moment corresponding to such remaining weight, a plurality of units related to given weights for the respective regions, a second plurality of units related respectively to the moments corresponding to such given weights, an indicator, means to select groups of units from said first and second pluralities of units for a desired sequence of regions to be loaded, means for determining the quotient of the value of the remaining moment with respect to the value of the remaining weight and the quotient of the value of the sum of the moments of such desired sequence of regions with respect to the sum of the associated weights and for comparing such quotients, and means controlled by said last named means, when said quotients have a given ratio for setting said indicator to a position which corresponds to the value of the first adjustable unit multiplied by a factor related to the number of regions in the desired sequence.

22. The combination set forth in claim 21 in which means controlled by said quotient determining means actuates a warning indicator when said first quotient predominates over said second quotient.

23. The combination set forth in claim 21 in which said comparing means comprises a bridge circuit, said first and second adjustable units are in two arms of said bridge and said two plurality of units are in two other arms of said bridge, and means controlled by unbalance of said bridge when said first quotient predominates over said second quotient and actuates a switch to actuate a warning indicator.

24. The combination set forth in claim 23 in which an amplifier is connected across said bridge and a motor controlled by said amplifier actuates said switch, means being provided to adjust the sensitivity of said amplifier.

25. The combination set forth in claim 21 in which said comparing means comprises a discriminator and a switch is actuated by said discriminator when said first quotient predominates over said second quotient, to actuate a warning indicator.

26. The combination set forth in claim 21 in which a plurality of switch means corresponding to each of such regions controls said two plurality of units, said switch means being arranged to bypass, when actuated, those of said two plurality of units related to the region having an associated actuated switch and said comparing means comprises a discriminator and an additional switch is actuated by said discriminator when said first quotient predominates over said second quotient, to actuate the switch means associated with the first region of such sequence.

27. Equipment for determining the distribution of a cargo weight into a sequence of regions of an aircraft for desired center of gravity position of the loaded aircraft, said equipment comprising an adjustable unit, means for setting said unit to a value related to the remaining weight of cargo to be loaded into the aircraft, a second adjustable unit, means to set said second unit to a value related to the remaining moment corresponding to such remaining weight, a plurality of units of predetermined values related to given weights for the respective regions, a second plurality of units of predetermined values related respectively to the moments corresponding to such given weights, means to select groups of units from said first and second pluralities of units for a desired sequence of regions to be loaded, an indicator, means for determining a first quotient of the value of the remaining moment with respect to the value of the remaining weight and a second quotient of the value of the sum of the moments of such desired sequence of regions less the first region with respect to the value of the sum of the associated weights and for comparing such quotients, and means controlled by said last named means when said first quotient is no greater than said second quotient, for seting said indicator to a position which corresponds to the value of the first adjustable unit multiplied by a factor related to the number of regions in the desired sequence.

28. Equipment for determining the distribution of a cargo weight into a sequence of regions of an aircraft for desired center of gravity position of the loaded aircraft, said equipment comprising an adjustable unit, means for setting said unit to a value related to the remaining weight of cargo to be loaded into the aircraft, a second adjustable unit, means to set said second unit to a value related to the remaining moment corresponding to such remaining weight, a plurality of units related to given weights for the respective regions, a second plurality of units related respectively to the moments corresponding to such given weights, a plurality of switch means controlling said two plurality of units, said switch means being arranged to bypass, when actuated, those of said two plurality of units related to the region having an associated actuated switch to select groups of such two pluralities of units for a desired sequence of regions to be loaded for determining a first quotient of the value of remaining moment with respect to the value of remaining weight and a second quotient of the value of the sum of the moments of such desired sequence of regions with respect to the value of the sum of the associated weight and for comparing such quotients, means controlled by said last named means, when said first quotient is no greater than said second quotient, to actuate the switch means associated with the last region of the desired sequence, means to determine a third quotient of the sum of the moments of the desired sequence of regions less the last region, to the sum of the associated weights, means to effect the comparison by said comparing means of the first quotient to the third quotient, an indicator and means controlled by said quotient comparing means, when said first quotient is no less than said third quotient, for setting said indicator to a position which corresponds to the value of the first adjustable unit multiplied by a factor related to the number of regions in the desired sequence.

29. Equipment for determining the distribution of a cargo weight into a sequence of regions of an aircraft for desired center of gravity position of the loaded aircraft, said equipment comprising an adjustable unit, means for setting said unit to a value related to the remaining weight of cargo to be loaded into the aircraft, a second adjustable unit, means to set said second unit to a value related to the remaining moment correspoding to such remaining weight, a plurality of units related to given weights for the respective regions, a second plurality of units related respectively to the moments corresponding to such given weights, a plurality of switch means controlling said two plurality of units, said switch means being arranged to bypass, when actuated, those of said two plurality of units related to the region having an associated actuated switch, to select groups of such two pluralities of units for a desired sequence of regions to be loaded for determining a first quotient of the value of remaining moment with respect to the value of remaining weight and a second quotient of the value of the sum of the moments of such desired sequence of regions with respect to the value of the sum of the associated weight and for comparing such quotients, means controlled by said last named means, when said first quotient is no greater than said second quotient, to actuate the switch means associated with the last region of the desired sequence, means to determine a third quotient of the sum of the moments of the desired sequence of regions less the last region, to the sum of the associated weights, means to effect the comparison by said comparing means of the first quotient to the third quotient, an indicator and means controlled by said quotient comparing means, when said first quotient is no less than said third quotient, for seting said indicator to a position related to the value of the weight to be loaded into the first region of the desired sequence, such value being such that the ratio of the difference between the then remaining moment determined by the setting of the second adjustable unit and the moment of such weight value for the associated region, to the difference between the then remaining weight determined by the setting of the first adjustable unit and such weight value, is equal to the ratio of the sum of the given moments of all of the region remaining of the desired sequence less the region associated with such weight value determined by the settings of the associated units of said plurality, to the sum of the given weights of all such regions less the region associated with such weight value determined by the settings of the associated units of said plurality.

References Cited in the file of this patent

UNITED STATES PATENTS

| | | |
|---|---|---|
| Re. 23,945 | Kolisch | Feb. 15, 1955 |
| 2,443,098 | Dean | June 8, 1948 |
| 2,657,857 | Carreyette | Nov. 3, 1953 |

UNITED STATES PATENT OFFICE
CERTIFICATE OF CORRECTION

Patent No. 2,901,171                                        August 25, 1959

Emil Kolisch

It is hereby certified that error appears in the printed specification of the above numbered patent requiring correction and that the said Letters Patent should read as corrected below.

Column 50, line 64, strike out "and"; column 51, line 55, after "loaded" insert -- , means --; column 52, line 17, for "correspoding" read -- corresponding --; line 27, after "loaded" insert -- means --.

Signed and sealed this 8th day of December 1959.

(SEAL)
Attest:

KARL H. AXLINE
Attesting Officer

ROBERT C. WATSON
Commissioner of Patents